(12) United States Patent
Coulombe et al.

(10) Patent No.: US 12,465,456 B2
(45) Date of Patent: Nov. 11, 2025

(54) SYSTEM AND METHOD FOR AUGMENTED INTELLIGENCE IN GUIDED DENTAL SURGERY

(71) Applicant: AiCAD Dental Inc., Chelsea (CA)

(72) Inventors: Fabien Coulombe, Chelsea (CA); Akshaykumar Ketankumar Patel, Ottawa (CA)

( * ) Notice: Subject to any disclaimer, the term of this patent is extended or adjusted under 35 U.S.C. 154(b) by 435 days.

(21) Appl. No.: 18/055,964

(22) Filed: Nov. 16, 2022

(65) Prior Publication Data

US 2024/0156567 A1    May 16, 2024

(51) Int. Cl.
| | |
|---|---|
| A61C 5/00 | (2017.01) |
| A61C 9/00 | (2006.01) |
| G06T 17/20 | (2006.01) |
| G06T 19/20 | (2011.01) |

(52) U.S. Cl.
CPC .............. *A61C 5/00* (2013.01); *A61C 9/0053* (2013.01); *G06T 17/20* (2013.01); *G06T 19/20* (2013.01); *G06T 2219/008* (2013.01); *G06T 2219/2012* (2013.01)

(58) Field of Classification Search
CPC ..... A16C 5/00; A61C 9/0053; A61C 13/0004; G06T 17/20; G06T 19/20; G06T 2219/008; G06T 2219/2012; G06T 2219/2016

See application file for complete search history.

(56) References Cited

U.S. PATENT DOCUMENTS

| | | | |
|---|---|---|---|
| 7,112,065 B2 | 9/2006 | Kopelman et al. | |
| 10,098,715 B2 | 10/2018 | Joshi | |
| 10,285,781 B2 | 5/2019 | Fujiwara et al. | |
| 10,932,890 B1* | 3/2021 | Sant | A61C 13/0004 |
| 11,234,792 B2 | 2/2022 | Yamamoto et al. | |
| 11,727,581 B2* | 8/2023 | Lang | A61C 9/004 345/8 |
| 12,232,923 B2* | 2/2025 | Anssari Moin | G06V 10/82 |
| 2011/0038514 A1 | 2/2011 | Weigl | |
| 2012/0156650 A1 | 6/2012 | Glidewell et al. | |
| 2019/0269485 A1* | 9/2019 | Elbaz | A61C 9/0053 |
| 2020/0175756 A1* | 6/2020 | Crowe | G06T 17/20 |
| 2020/0273248 A1 | 8/2020 | Jørgensen et al. | |
| 2021/0030378 A1 | 2/2021 | Heo et al. | |

(Continued)

FOREIGN PATENT DOCUMENTS

| | | |
|---|---|---|
| KR | 101888361 B1 | 9/2018 |
| WO | 2012045314 A1 | 4/2012 |
| WO | 2022177095 A1 | 8/2022 |

*Primary Examiner* — Xiao M Wu
*Assistant Examiner* — George Renze

(57) ABSTRACT

A computer-implemented system and method for displaying a target abutment for guided surgical preparation of a tooth for receiving a crown or dental prosthetic. Two dimensional images (2D) of the tooth are obtained from a dental scanner and converted into a three dimensional (3D) image, which is converted into a mesh data file representation of tooth. The mesh file is then converted into one or more 2D descriptor matrixes which can be used to match the tooth to a target abutment in a descriptor database. The target abutment and image of the tooth to be shaped can be used as a input to an image blender algorithm which gives the blending image of the tooth for surgical preparation and the targeted abutment to guide a dentist in creating the target abutment from the existing tooth.

18 Claims, 23 Drawing Sheets

(56) References Cited

U.S. PATENT DOCUMENTS

| | | |
|---|---|---|
| 2021/0236239 A1 | 8/2021 | Takada et al. |
| 2021/0264600 A1* | 8/2021 | Jellinggaard .......... A61B 34/74 |
| 2022/0012815 A1* | 1/2022 | Kearney ................ G06N 20/20 |
| 2022/0030162 A1* | 1/2022 | Cramer .................. G06T 7/251 |
| 2022/0183789 A1 | 6/2022 | Ciriello et al. |
| 2022/0246269 A1 | 8/2022 | Choi et al. |
| 2022/0265400 A1 | 8/2022 | Jeong et al. |
| 2022/0331076 A1* | 10/2022 | Choi ..................... A61C 8/005 |

* cited by examiner

A

B

C

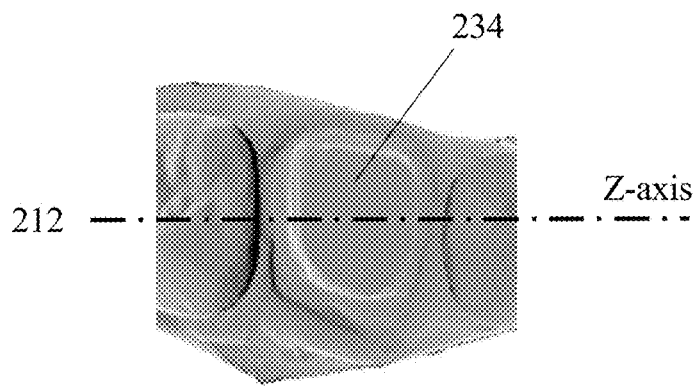
FIG. 12A
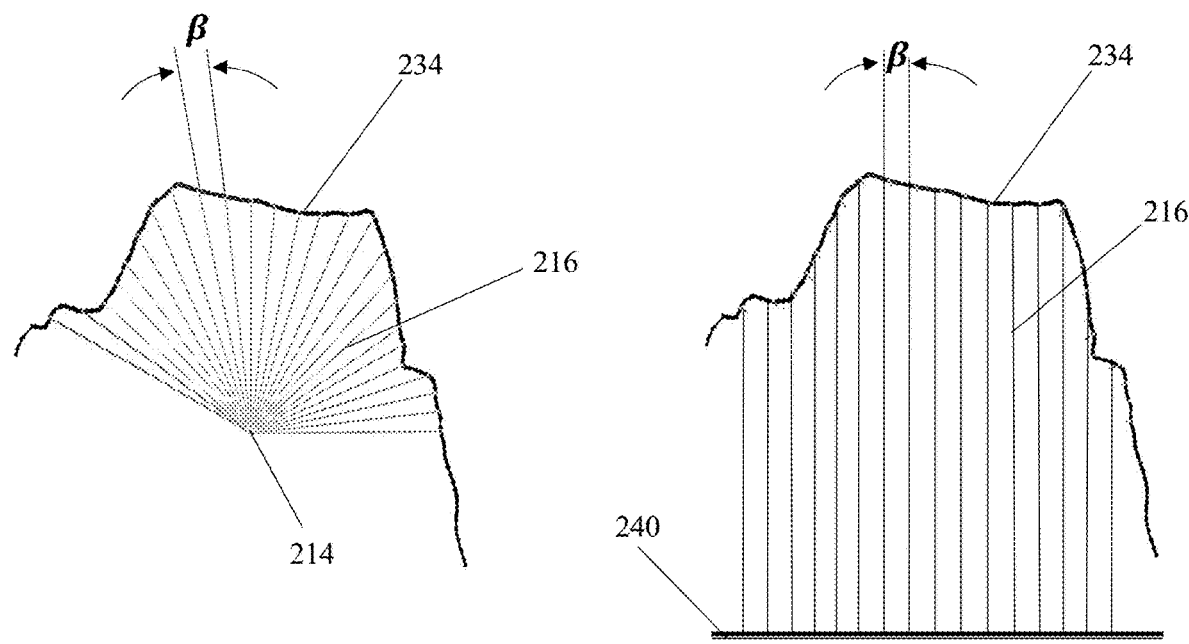
FIG. 12B          FIG. 12C

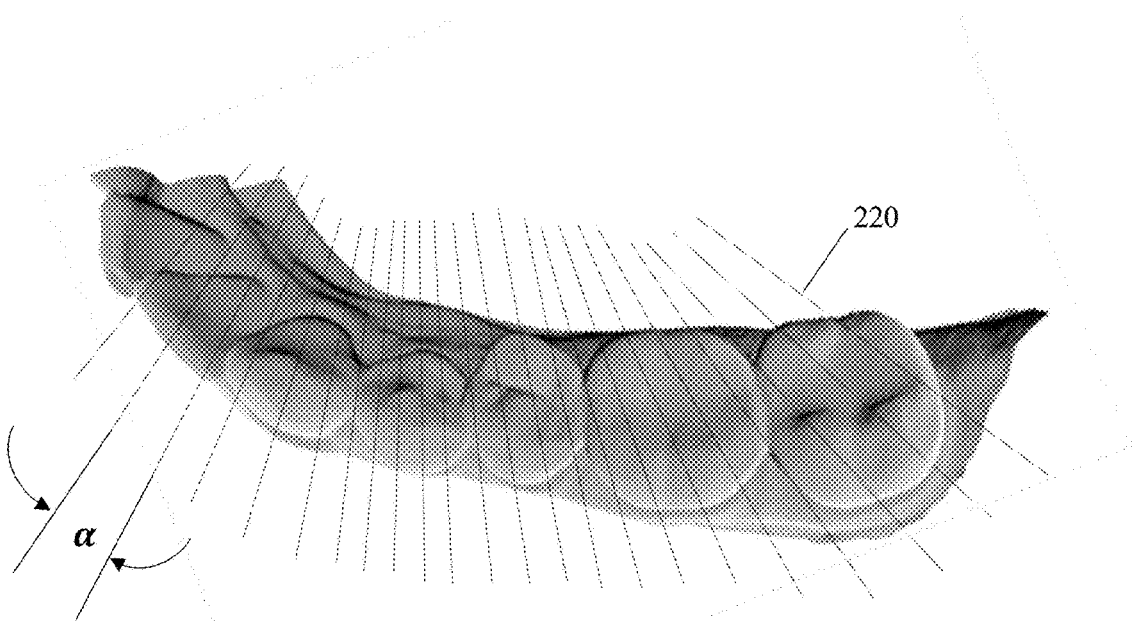
FIG. 13A
| | | | | | | | | | | | | | | | | | | | | |
|---|---|---|---|---|---|---|---|---|---|---|---|---|---|---|---|---|---|---|---|---|
|1.11|1.04|1.18|1.19|1.11|1.16|1.28|1.18|1.18|1.23|1.19|1.19|1.14|1.15|1.13|1.15|1.35|1.20|1.14|1.18|1.18|
|1.33|1.32|1.40|1.39|1.32|1.33|1.32|1.33|1.34|1.07|1.31|1.30|1.22|1.23|1.13|1.28|1.15|1.21|1.21|1.18|1.24|1.25|
|1.16|1.28|1.35|1.33|1.23|1.30|1.24|1.33|1.40|1.24|1.18|1.19|1.07|1.08|1.07|1.21|1.17|1.19|1.17|1.19|1.05|1.11|
|0.81|0.88|0.80|0.92|0.88|0.86|1.09|1.07|1.02|1.12|0.95|1.12|1.07|1.14|0.99|0.99|1.07|1.14|1.03|1.03|1.18|1.18|
|0.55|0.58|0.56|0.52|0.58|0.51|0.57|0.62|0.68|0.73|0.54|0.49|0.58|0.49|0.56|0.47|0.58|0.56|0.48|0.49|0.58|0.38|
|0.76|0.77|0.83|0.78|0.90|0.91|0.82|0.88|0.91|0.85|0.89|0.93|0.76|0.72|0.74|0.68|0.63|0.69|0.78|0.72|0.57|0.74|
|0.68|0.71|0.64|0.62|0.81|0.74|0.81|0.71|0.79|0.78|0.78|0.77|0.60|0.80|0.74|0.82|0.76|0.77|0.79|0.77|0.81|0.66|
|0.62|0.65|0.67|0.66|0.66|0.65|0.63|0.64|0.55|0.54|0.55|0.59|0.59|0.64|0.57|0.56|0.64|0.60|0.61|0.62|0.59|0.61|
|0.58|0.49|0.50|0.47|0.47|0.45|0.46|0.47|0.47|0.53|0.54|0.41|0.40|0.42|0.38|0.32|0.33|0.31|0.34|0.31|0.34|0.35|
|1.23|1.10|1.07|1.02|0.84|0.88|0.77|0.76|0.88|0.65|0.62|0.60|0.53|0.55|6.37|6.31|6.31|6.31|6.36|6.33|6.28|6.45|
|8.48|8.42|8.41|8.00|7.83|7.61|7.35|7.87|7.58|7.13|7.07|6.94|6.81|6.71|6.68|6.75|6.50|6.37|6.43|8.49|6.13|6.13|
|10.14|10.15|10.00|9.99|9.98|9.89|9.86|9.80|9.85|9.82|9.93|9.81|9.79|9.76|9.89|9.68|9.66|9.65|9.67|9.72|9.77|9.77|
FIG. 13B
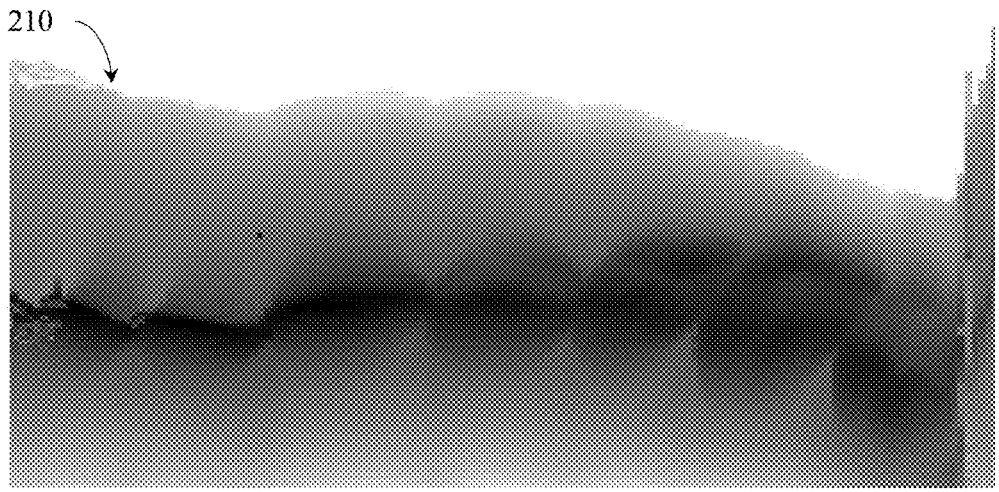
FIG. 13C

SYSTEM AND METHOD FOR AUGMENTED INTELLIGENCE IN GUIDED DENTAL SURGERY

FIELD OF THE INVENTION

The present disclosure generally relates to dental imaging and guided surgery technology. The present disclosure also relates to system and method for augmented intelligence in dental pattern recognition using specially formatted stacked data arrays for guiding tooth abutment shaping for dental surgery and prosthetic preparation.

BACKGROUND OF THE INVENTION

Dental imaging technologies are used in a modern dental practice to image the mouth and teeth, as well as the underlying bone and jaw structure. Dental imaging can provide a wide range of information for improving the care of patients, including for monitoring tooth movement, gum changes, for designing dental implants and prosthetics, and for investigations prior to surgery. In the design of dental prosthetics and implants, for example, there are a variety of imaging technologies and associated dental computer aided design (CAD) software technologies that are used to provide two dimensional (2D) as well as three dimensional (3D) images of the teeth, gums, and mouth to enable a technician to design and build an implant that fits the patient. Imaging is generally done using one or more optical cameras, digital scanners, or using x-rays such as with computed tomography (CT) or radiography. By combining multiple 2D images or cross sectional images a 3D image of the mouth or teeth area can be constructed as a mosaic of 2D images. A dental implant or prosthetic can be designed based on this captured 3D image of the mouth, or in combination with traditional 3D impression methods using forms and putty.

An abutment is a shaped or shaved down tooth that is surgically prepared for receiving a dental crown. In current dental abutment preparation the dentist is required to use their judgement to shave and shape the tooth into a suitable shape and to a suitable size to receive a crown, cap, or prosthetic. During the preparation, the abutment is prepared in a dentist's office, an image or 3D impression is then taken of the completed abutment for preparation of a permanent crown or cap, and the dentist then applies a temporary crown to the abutment until the crown or cap has been manufactured. The image and/or 3D impression is then sent to a dental prosthetics laboratory for design of a crown or cap to fit the abutment that the dentist has surgically created. Once the crown has been manufactured the patient returns to the dentist's office for fitting, adjustment, and placement of the prosthetic crown. This requires multiple steps both by the dentist and the patient, and at least two dental trips for the patient, with additional trips required if the crown does not fit the abutment or the mouth or causes discomfort to the patient. It is critical that the permanent crown is well-fitting and properly sealed, as ill-fitting crowns can result in local cavity formation at the site of the abutment as well as infection of the tooth and gums.

In one example of dental abutment shaping design, U.S. Pat. No. 11,234,792B2 to Yamamoto et al. describes a method of estimating and restoring an abutment tooth to create an abutment tooth model by obtaining a physical 3D impression with an impression putty material in the patient's oral cavity and scanning the physical 3D impression to obtain three-dimensional data which is read into dental computer-aided design (CAD) software to determine a finish line for the abutment and produce an abutment tooth model shape.

Currently dentists generally surgically prepare the tooth abutment site by feel and are trained to guess how much the targeted tooth needs to be reduced, where to position the abutment margin line, how to shape the abutment to receive the crown, and how to shape the tooth relative to the gum line as it recessed during the surgery. Judgement used to consider each of these factors must also take into account the material of the crown, as different crown materials require different crown cross-sectional widths for strength and durability. As a result the dentist often needs to rework either or both of the abutment and the manufactured crown after shaping and manufacture to ensure a proper fit. If the fit of the tooth abutment and the manufactured crown is too far off or do not engage properly, additional work may also be required from the dental lab to adjust or even recreate the crown, causing multiple trips of the patient to the dentist and additional work by the dentist and dental lab.

In current digital workflows, computer-aided design for orthodontic, prosthetic, periodontic, and other dental modeling, is an extremely labor-intensive step and often the most time-consuming and expensive step in the dental prosthetic manufacturing process. In contrast, computer-Aided Manufacturing (CAM) of dental frameworks using 3D printers and computer numeric control (CNC) is comparably faster than CAD, requires little skill labor, and the material used for prosthetics manufacturing is quickly getting less expensive. There remains a need for a method and system for tooth abutment and crown dental preparation that improves the design of crowns and matching abutments.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

The present invention may be described herein in terms of various system, components, and processing steps. Many further features and combinations thereof concerning embodiments described herein will appear to those skilled in the art following a reading of the instant disclosure.

An object of the present invention is to provide a system and method for dental imaging and guided surgery technology using augmented intelligence in dental pattern recognition using specially formatted stacked data arrays. These can be used for guiding tooth abutment shaping for dental surgery and for prosthetic preparation.

In an aspect there is provided a method of guiding tooth abutment shaping comprising: scanning a tooth with a scanner to obtain a three dimensional (3D) image of the tooth; converting the 3D image of the tooth into a 3D mesh file of the tooth; converting the mesh file of the tooth into a two dimensional (2D) descriptor matrix representation of the tooth; selecting a target abutment for the tooth from a descriptor database, the abutment linked to a tooth shape in the descriptor database that matches the tooth; and, on a graphical user interface, displaying an overlay image of the tooth with an image of the selected target abutment to guide shaping of the tooth into an abutment.

In an embodiment, the image of the tooth to be shaped and the image of the selected abutment displayed on the graphical user interface are 3D images.

In another embodiment, the image of the tooth and the image of the selected abutment displayed on the graphical user interface are rotatable and can be rotated in space on the graphical user interface.

In another embodiment, the 2D descriptor matrix representation of the tooth and the 2D descriptor matrix representation of the selected abutment are aligned by a common centroid.

In another embodiment, in the overlay image, at least one of the image of the tooth and the image of the selected abutment is displayed with transparency.

In another embodiment, the overlay image is colored to illustrate a difference between the tooth to be shaped and the target abutment.

In another embodiment, selecting a target abutment comprises: matching the tooth with at least one matched tooth from a descriptor database of 2D matrixes representations of teeth; and retrieving an abutment from the database that is linked to the at least one matched tooth.

In another embodiment, matching the tooth with at least one matched tooth from the descriptor database comprises comparing the 2D descriptor matrix representation of the tooth with a plurality of 2D descriptor matrixes in the descriptor database and selecting at least one matching tooth based on a set threshold based on a subtraction algorithm.

In another embodiment, the 2D descriptor matrix representation of the tooth and tooth shapes in the descriptor database are created using a dental file segmentation method using a common centroid.

In another embodiment, converting the mesh file of the tooth into a 2D descriptor matrix comprises: assigning an indexing centroid to the 3D mesh file; measuring a length of each of a plurality of indexing rays, each indexing ray extending from the indexing centroid to a surface of the tooth; and storing the length for each of the plurality of indexing rays in a 2D matrix to create a 2D descriptor matrix of the 3D mesh file.

In another embodiment, the method further comprises re-scanning the tooth to be shaped to obtain an updated scan, converting the updated scan into an updated 2D descriptor matrix representation of the tooth, and updating the image of the tooth and the overlay image in the graphical user interface.

In another embodiment, the method further comprises measuring a distance between the target abutment and the tooth and indicating in the graphical user interface an amount and location of tooth shaping required by coloring the overlay image according to the measured distance.

In another embodiment, the overlay image is created using an image blender algorithm.

In another embodiment, the method further comprises selecting the target abutment based on similarity of the 2D descriptor matrix representation of the tooth to descriptor matrixes in the descriptor database matching one or more of gum surface, abutment surface, tooth surface, opposite occlusal surface, crown shape, crown material, tooth shape, tooth location, abutment margin line, gum line, and crown method of manufacture.

In another aspect there is provided a system for guiding tooth abutment shaping comprising: a dental scanner for scanning a tooth; a descriptor generating system for receiving a 3D mesh file of the scanned tooth from the dental scanner and creating a 2D descriptor matrix of the tooth; a descriptor database comprising a plurality of 2D descriptor matrixes for a plurality of teeth; a lookup algorithm to compare the 2D descriptor matrix of the scanned tooth to 2D descriptor matrixes of teeth in the descriptor database to select a similar tooth based on the similarity of the 2D descriptor matrix of the scanned tooth and a 2D descriptor matrix of the similar tooth and identify a target abutment linked to the similar tooth; an image blender for creating an overlay 3D image of the tooth and a 3D image of the target abutment; and a graphical user interface for displaying the overlay 3D image.

In an embodiment, the 3D image of the tooth and a 3D image of the target abutment are encoded by 3D mesh files.

In another embodiment, the descriptor database comprises a plurality of descriptor stacks, each descriptor stack comprising a plurality of descriptor matrixes linked to the same tooth.

In another embodiment, the plurality of descriptor stacks comprise one or more tooth surface descriptor matrix, gum surface descriptor matrix, adjacent tooth surface descriptor matrix, occlusal tooth surface descriptor matrix, abutment surface descriptor matrix, crown interior surface descriptor matrix, and crown exterior surface descriptor matrix.

In another embodiment, the plurality of descriptor matrixes are anchored in space.

In another embodiment, the descriptor generating system comprises: an indexed slicer for slicing the mesh file into a plurality of slices, each slice comprising a cross-sectional boundary of the dental object; a radial encoder assigning an indexing centroid and measuring a plurality of rays from the indexing centroid to the cross-sectional boundary; and a Fourier neural operator unit to transform the plurality of ray lengths into a 2D descriptor matrix of the tooth.

BRIEF DESCRIPTION OF THE FIGURES

For a better understanding of the present invention, as well as other aspects and further features thereof, reference is made to the following description which is to be used in conjunction with the accompanying drawings, where:

FIG. 12A illustrates an example z-axis position for an abutment and the alignment of an abutment;

FIG. 12B illustrates the indexing of one cross section plane of an abutment with a plurality of indexing rays;

FIG. 12C illustrates the indexing of one cross sectional plane of an abutment at a far indexing centroid serving as a reference locus;

FIG. 13A illustrates an example of a bitewing with a slicing centroid peripheral to the bitewing;

FIG. 13B is an example of an output 2D descriptor matrix of the bitewing shown in FIG. 13A;

FIG. 13C illustrates an example of a matrix visualization of the bitewing as a 2D descriptor matrix;

Figure 1:
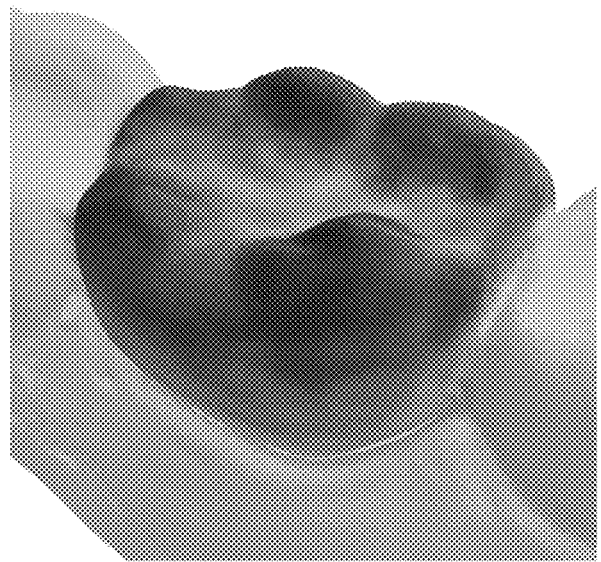
FIG. 1 provides a set of 3D images demonstrating how the present system and method guide a dentist to shape a tooth into an abutment suitable for receiving a crown.
Figure 1:
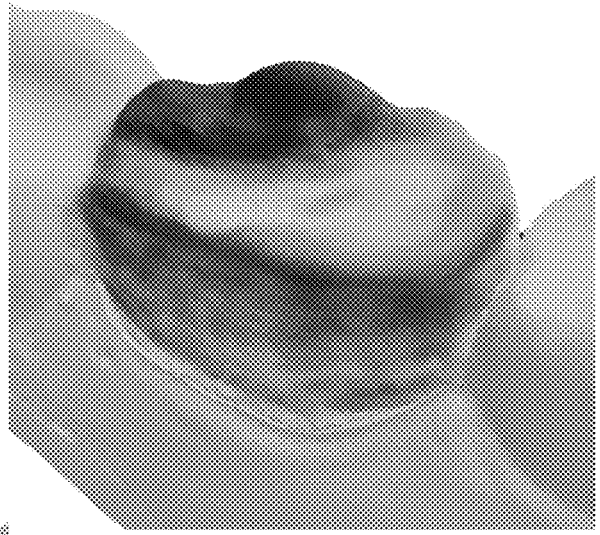
Figure 1:
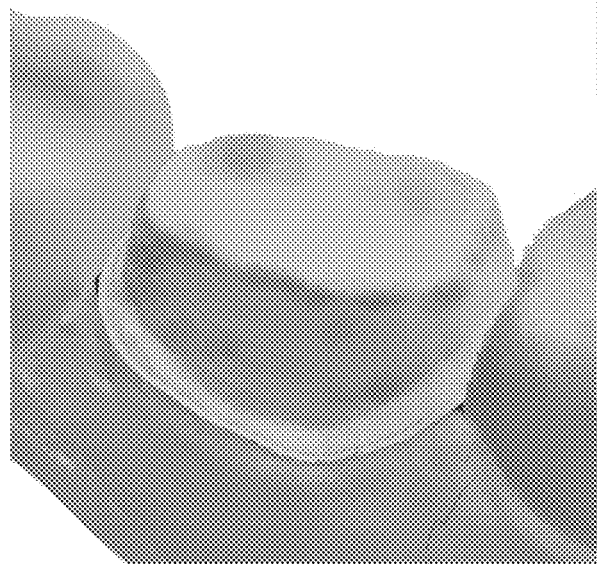

Embodiments of methods, systems, and apparatus are described through reference to the drawings. Applicant notes that the described embodiments and examples are illustrative and non-limiting. Practical implementation of the features may incorporate a combination of some or all of the aspects and features as described herein.

DETAILED DESCRIPTION

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprise" and any of its derivatives (e.g. comprises, comprising) as used in this specification is to be taken to be inclusive of features to which it refers, and is not meant to exclude the presence of any additional features unless otherwise stated or implied. The term "comprising" as used herein will also be understood to mean that the list following is non-exhaustive and may or may not include any other additional suitable items, for example one or more further feature(s), component(s) and/or element(s) as appropriate.

As used herein, the terms "having," "including" and "containing," and grammatical variations thereof, are inclusive or open-ended and do not exclude additional, unrecited elements and/or method steps, and that that the list following is non-exhaustive and may or may not include any other additional suitable items, for example one or more further feature(s), component(s) and/or element(s) as appropriate. A composition, device, article, system, use, process, or method described herein as comprising certain elements and/or steps may also, in certain embodiments consist essentially of those elements and/or steps, and in other embodiments consist of those elements and/or steps and additional elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to. The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed or removably affixed solid-state storage drives, an object, an executable, a computer-executable program, and/or a computer. By way of illustration, both an application running on a server and the server can be a component. One or more components can reside within a process, and a component can be localized on one computer and/or distributed between two or more computers and/or cloud-based computer networks. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet or cloud with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. A component can also be an apparatus that provides specific functionality through electronic components without mechanical parts, the electronic components can include a processor therein to execute software or firmware that provides at least in part the functionality of the electronic components, and software can be stored locally or externally and be functionally connected to the component. Interface(s) can include one or more input/output (I/O) components as well as one or more associated processors, applications, or Application Programming Interface (API) components. While the foregoing examples are directed to aspects of a component, the exemplified aspects or features also apply to a system, platform, interface, layer, controller, terminal, server, cloud, and the like.

Herein is described a system and method for guided tooth abutment shaping in dental imaging and surgery technology. Also described herein is a system and method for augmented intelligence in dental pattern recognition using specially formatted stacked data arrays or descriptor matrixes for guiding tooth abutment shaping for dental surgery and prosthetic preparation and design. In some embodiments, a method and system to process and use tessellated file formats during guided dental surgery is provided. The method can be used in the dental industry for computer-aided design (CAD) and computer-aided manufacture (CAM) in guided dental surgical preparation and dental prosthetic design and manufacture.

The present system and method uses 2D descriptor matrixes representative of 3D dental objects such as a tooth or teeth to rapidly align and compare individual teeth for guided surgical abutment preparation. Due to the small size of the descriptor matrixes, real time guidance can be provided to the dentist during the surgical procedure on a dentist display to improve the design of the abutment based on a variety of factors including but not limited to crown shape, crown material, tooth shape, tooth location, abutment margin line, gum line, occlusal surface, and tooth environment.

Augmented intelligence in dental file segmentation as described herein converts standard STL or tessellated mesh file image formats (also referred to as standard tessellating language or STL files) into one or more two dimensional (2D) descriptor matrixes with a common reference point or reference locus, referred to herein as a centroid. Multiple descriptor matrixes having the same common reference locus describing related dental surface structures around a tooth enables the description of different dental surfaces around the common reference locus in a single patient with a smaller data set, enabling faster processing and matching to similar descriptor matrixes in a descriptor database, enabling the use of artificial intelligence in dental surgery, and prosthetic preparation, design, and manufacture. Each descriptor matrix can describe a single aspect or surface of the tooth and tooth environment, and the set of matrix descriptor matrixes, or matrix stack, provides a full description of the surfaces of the tooth and tooth environment. This full description of surfaces can then be used to determine a suitable abutment shape and provide guidance to the dentist in a graphical user interface for surgically shaving and shaping the abutment. The surfaces can include, for example, gum surfaces, tooth and teeth surfaces, post or abutment surfaces, interior and exterior crown surfaces, and other occlusal surfaces in the mouth. In addition, matching one or more crown shapes from the descriptor database to the tooth enables more rapid crown design in view of the target abutment for the tooth and its associated tooth environment.

One example method of dental file segmentation for creating a descriptor matrix of a tooth comprises slicing a three-dimension (3D) representation of the tooth into a number of two-dimension (2D) cross-sectional slices, and for each 2D cross-sectional slice determining an indexing centroid and a plurality of radial lengths measured from the slicing centroid to the cross-sectional boundary. Each radial length is measured between the indexing centroid or reference locus and a different point on a perimeter or surface boundary of the cross-section and preferably each radial length is separated by a same angle measured from the indexing centroid. The plurality of radial lengths are then stored in a descriptor matrix. In one example, a first dimension or row of the resulting 2D descriptor matrix comprises an identification of the number of the plurality of cross-section slices or slicing planes, and the second dimension or column of the descriptor matrix comprises the number and lengths of each of the plurality of indexing rays in each slice or slicing plane. In another example the descriptor matrix dimensions can comprise, for example, declination angle from normal relative to a z-axis that extends through the tooth and a right ascension angle from a reference point perpendicular to the z-axis to define the dental object in a 2D descriptor matrix, referred to herein as an angular indexing method.

The 2D descriptor matrix can be assigned a descriptor type based on the type or surface of dental object imaged, including an identification of the tooth location, and represented by the descriptor matrix. A plurality of descriptor matrixes can be generated for the same tooth, and each descriptor matrix can describe a single surface in and around the tooth and can be used to match similar teeth and surface features from a descriptor database for computer-aided design, computer-aided manufacturing, and guided surgical preparation. Once the 3D image of the tooth is segmented, each descriptor matrix can be stacked and classified by key feature and compared against other key feature matrixes using one or more Convolutional Auto Encoder for matching and analysis. When the tooth and its associated dental surfaces are assigned a common centroid or reference locus and multiple descriptor matrixes are created using the same common reference locus, the plurality of descriptor matrixes of the same dental object or region can be stacked to provide a multi-dimensional view of the dental object, where each descriptor matrix can be independently matched with similar descriptor matrixes in a descriptor database. This can assist with, for example, crown design, and in guiding a dentist on abutment design and creation during surgical preparation.

The conversion of the standard 3D image mesh files into one or more 2D descriptor matrixes reduces the data size of dental image files such that dental images can be manipulated and compared to other dental files and can be presented to the dentist in a graphical user interface during the dental procedure of shaping the abutment in real time. The descriptor matrixes can also be used in machine learning and matching systems to select a suitable abutment shape for a particular tooth based on the surface in the tooth environment using artificial intelligence matching to a descriptor database of pre-processed abutment, crown, and tooth environment surfaces. The present system and method uses 2D descriptor matrix representation of tooth objects to match a particular tooth for surgical shaping into an abutment with a pre-designed crown and abutment and provides a visualization of the tooth with the desired shaping abutment outline to guide the shaping of the abutment. The resulting abutment after shaping and updated visualized confirmation will be a close fit to the pre-designed crown, enabling a one-visit quality crown fitting for patient and dentist. The design and manufacture of 3D printed crowns at the dentist site reduces the number of dental visits and speeds up the process of the dental procedure.

The conversion of the standard 3D image mesh files into one or more 2D descriptor matrixes reduces the data size of dental image files such that dental images can be manipulated and compared to other dental files and can be used in machine learning and matching systems. This expedites the design and manufacture of dental prosthetics and appliances because machine learning systems can more easily and quickly match related descriptor matrixes, thus reducing the cost of dental monitoring and treatment. Storage of dental files is also reduced in cost by reducing the file size, thus facilitating the tracking of dental patients for dental professionals and increasing the speed of recall of dental files thus facilitating rapid updating in dental image comparison, visualization, and display. Data sets comprising descriptor matrix stacks describing dental patterns are, on average, between ten and one hundred times smaller than the data contained in the 3D digital impression files in native format (STL or any meshing format) required for encoding all of the stacked descriptor arrays. Due to the reduced size of the present data sets compared to their corresponding mesh files, dental patterns can be clustered in a very large database to match any specific patterns in real time using a trained convolutional neural network to assist with treatment, such as surgery planning, tracking, and verification, as well as prosthetic design. Surgical treatment patterns can also be proposed nearly instantly by matching the various descriptor matrixes in the descriptor stack of a tooth with similar descriptor matrixes in a descriptor database, and solutions can be recommended based on the similar descriptor matrixes and prognosis of similar cases. Dental object matching can also be done using the presently described method of dental file segmentation followed by representation of the three dimensional (3D) dental object as a two dimensional (2D) matrix to identify closely matching dental prosthetics for acceleration of the CAD process.

The system comprises at least one processor and a memory storing instructions which when executed by the at least one processor configure the at least one processor to carry out the presently described methods. Different types of descriptor matrixes for a variety of dental surfaces can also be stacked and passed through a Convolutional Auto Encoder to regenerate the descriptor again and train the Convolutional Auto Encoder for augmented intelligence in 3D file matching and CAD. The present method will not only be helpful to the dental industry but may also have a significant impact for the CAD/CAM industry and other industries that use tessellated surfaces and tessellated or mesh file formats.

The present disclosure may be described herein in terms of various components and processing steps, and each component provides different features of dental anatomy. Some processing steps described herein include an indexed slicer, a radial encoder, a Fourier neural operator, and a visualization unit which converts the descriptor matrix into an image file format that can be viewed on a screen in a graphical user interface. The visualized output or visualization maps may also be stacked to facilitate imaging of a plurality of features into a single object. In some embodiments, an indexed slicer divides dental anatomy into slices so that a plurality of cross-sections can be created which can further be indexed and converted to a numerical representation in a radial encoder. In some embodiments, the radial encoder may map the cross-section from a particular slicing centroid. Once a mapping has been completed the next step is to store the data strategically. In some embodiments, this is achieved by a Fourier neural operator and an output visual rendering for each 2D descriptor matrix value mapping (visualization) that allows a field expert (e.g. dentist, data scientist, software developer, etc.) to recognize key features described by each descriptor matrix. The set of descriptor matrixes may then be stacked to describe the full dental anatomy. For example, into a tooth descriptor stack, a quadrant descriptor stack, a dental arch descriptor stack, and/or a shade pattern descriptor stack. Furthermore, a bite pattern and a bite registration descriptor may be provided in a similar manner as the encoding method. These descriptors allow for two linked output formats: a 2D descriptor matrix; and a 3D image format. With the presently described descriptor matrixes, a dental professional can, for example, review a bite, compare before and after images of the dental implant or crown, observe gumline changes, and design dental prosthetics.

The herein mentioned components can be performed in a variety of hardware types. One skilled in the art understands that the methods described below may import meshes from various formats including binary/ASCII STL, Wavefront OBJ, ASCII OFF, binary/ASCII PLY, GLTF/GLB 2.0, 3MF, XAML, 3DXML, etc. For simplicity of the present description, STL or mesh format form will be used herein as an exemplary file format, however it is understood that other 3D file formats describing surface structures may also be used with the described methods, including but not limited to point cloud data file formats. The methods described below are a few of the exemplary applications for the present disclosure and the present system and method includes corresponding systems and devices, and logic structures such as machine-executable coded instruction sets for implementing such systems and methods.

The principle, features, and methods discussed herein may be applied to any dental application that works with three-dimensional anatomy, or any 3D anatomy comprising a surface structure that can be imaged. It should be noted that the methods and descriptor stacks described herein can also have an application other than the dental industry and the embodiments are not limited in application to the details of construction and to the arrangements of the components set forth in the present description or illustrated in the drawings. The phraseology and terminology employed herein are for the purpose of description and should not be regarded as limiting. It should also be noted that for illustrative purposes, the various exemplary methods and systems may be described in connection with a single tooth or other oral or dental structure of a patient. However, such exemplary methods can also be implemented with another type of tooth or dental object within a patient such as molars, canines, premolars, etc. For example, an incisor tooth may be illustrated in a single tooth descriptor method, and the same method can also be performed with premolars, molars, and other teeth. In some embodiments, similar ideology may apply to other methods and descriptor stacks. It is understood that the embodiments described herein are not limited in application to the details of construction and to the arrangements of the components set forth in the following description or illustrated in the drawings.

FIG. 1 is a set of 3D images demonstrating how the present system and method guide a dentist to shape a tooth into an abutment suitable for receiving a crown. Image A is an image of a tooth to be shaved into an abutment, image B is an overlay image depicting the tooth mid-procedure after some shaving has been done but the process is not yet complete, and image C is a target abutment shape for the tooth shown in image A. All three images shown are the result of blended images, meaning the result of overlapping or mosaicking the 2D visual scans done by the dentist to produce a 3D visual representation of the tooth using an image blender algorithm. Shown in image A is a 3D visual representation of the tooth to be shaped into an abutment, which is represented using a 2D descriptor matrix to produce the image overlay showing the tooth surfaces and surrounding tooth and gum surfaces. In preparation for a surgical procedure to create the abutment from the tooth, multiple images of the tooth are taken from various angles using a camera, x-ray, dental scanner, or other imaging device, and a 3D image of the tooth is created from the multiple images.

To create the image representation shown, the 3D image of the tooth is converted into a tessellated 3D mesh file. The mesh file is then converted into one or more 2D descriptor matrixes which contains information on the exterior of the surface of the tooth, and also on other surfaces surrounding the tooth, such as the surfaces of adjacent teeth, the gumline, and occlusal surfaces on opposing or facing teeth. Once the tooth descriptor matrix has been created as a representation of the starting tooth, a target abutment can be selected and/or designed based on the shape of the starting tooth. The target abutment can be retrieved from a database of 2D descriptor matrixes describing tooth surfaces including tooth and crown exterior surfaces and dental environment surfaces, as will be described later. The target abutment image is then overlapped or overlayed with the tooth image to create a composite overlay image B, where darker areas show the dentist where additional tooth needs to be removed to create the target abutment shape. The dentist can then remove tooth matter in the dark areas as shown. Additional 3D scans can be taken of the tooth during the procedure and compared in real time to the target abutment to again show the dentist a visual image of where additional material needs to be removed to create the target abutment. In all three stages the target abutment scan remains the same and as the dentist carves the target tooth scans can be taken at different stages to provide the dentist with guidance on where additional material needs to be removed.

Image A shows the initial stage of the tooth prior to the surgical procedure of tooth shaping when the dentist has not yet begun shaping the tooth. The dark gray color-coded area illustrates where the dentist needs to remove the bone. Image B shows the intermediate stage where the dentist has removed some part of the targeted tooth bone, and the dark gray color-coded area is reduced as compared to image A. The light or white area on image B shows where sufficient bone has been removed and where the tooth is closest to the target abutment shape. Image C shows the final stage target abutment blended scan where there is no more dark gray area on the targeted tooth surface. The dentist can also check the accuracy of the completed abutment against the targeted abutment to ensure close match to the target abutment. Additionally, as the abutment is required to have sides with a sufficient angle toward the tooth axis to properly receive a crown with smooth surfaces and no overhang areas, checking the created abutment with a final scan and comparing it against the target abutment can provide guidance to the dentist on any locations on the created abutment that need to be adjusted. Additionally, the final scan of the abutment can be used to create a surface description of the abutment for sending to a CAD/CAM system to create the surface of the matching crown.

Figure 2:
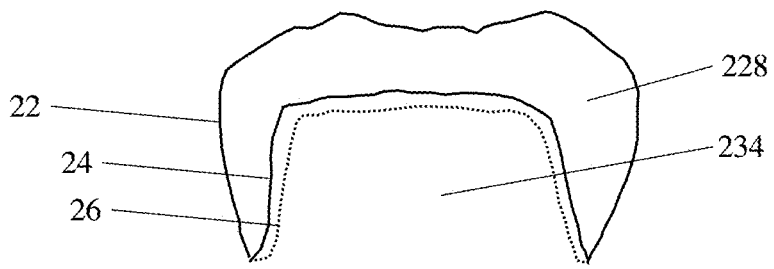
FIG. 2 is a digital representation of a cross section of a dental crown and matching abutment and 3D mesh surface representations thereof.
Figure 2:
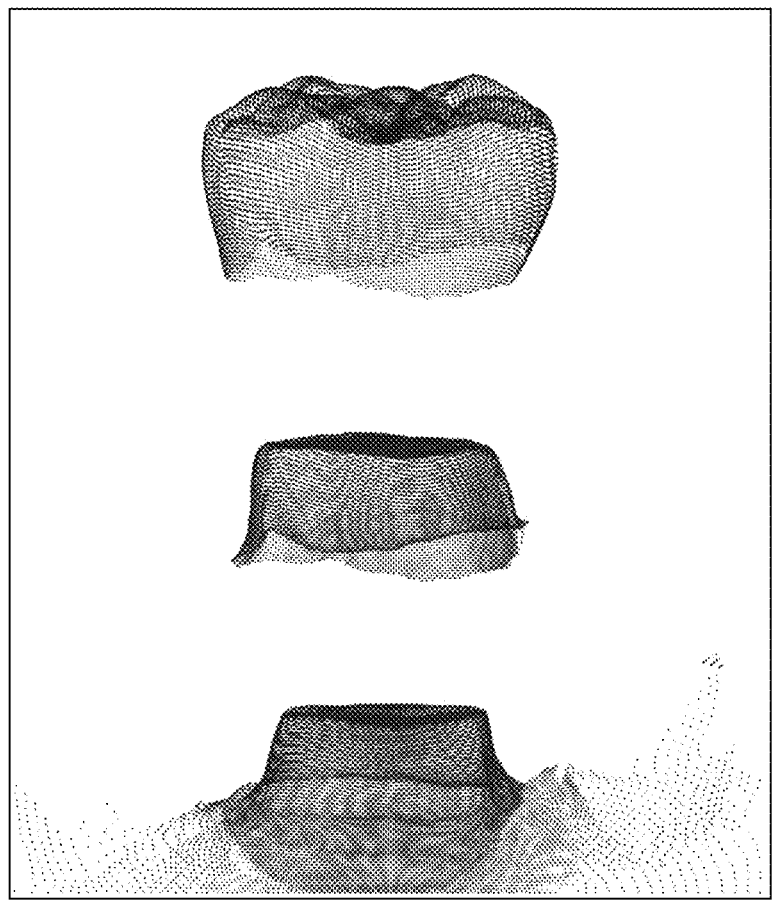

FIG. 2 is a digital representation of a cross section of a dental crown 228 and matching abutment 234 and 3D mesh surface representations thereof. The crown 228 comprises a crown exterior surface 22 that must be designed to match all of the dental surfaces in the environment of the tooth to which it will be replacing. The surface features that need to be considered in the design of the crown exterior surface include, for example, the gum surface, adjacent teeth surfaces, opposite teeth occlusal, abutment margin line, and gum line. Shown from top to bottom in the box in FIG. 2 are the 3D mesh representation of the exterior surface of the crown, the 3D mesh representation of the interior surface of the crown, and the 3D mesh representation of the target abutment surface to match the interior surface of the crown. To create a suitable crown, the desired crown exterior surface as well as the crown thickness must be designed, where the thickness of the crown depends on which tooth is being fitted with a crown as well as the material desired for use in the crown. In particular, the tooth must be prepared and shaped to receive the crown, and the margin depth for shaping the tooth is dependent on the crown material. In a few examples, porcelain fused to metal crowns require at least 0.3 mm depth removed, porcelain crowns require 0.5-1.5 mm depth removed, porcelain fused to zirconia crowns require 0.4-0.5 mm removed, and gold or metal occlusal crowns require at least 0.5 mm depth removed. The shape of the crown interior surface 24 is therefore determined by the desired shape of the crown exterior surface 22 taken together with the desired thickness of the crown as determined by the crown material and tooth location. Further, the shape of the tooth abutment surface 26 required to mate or match with the crown interior surface 24 is determined by the crown material and tooth location. By taking dental images before, during, and at the end of the dental procedure of surgical abutment shaping the dentist can be guided into creating a suitable abutment for receiving the desired crown. Additionally, an image of the completed abutment can be sent directly to a CAD/CAM system on site at the dentist office for immediate and on-site preparation of either a temporary or permanent crown by a 3D manufacturing device, such as a 3D printer.

Figure 3:
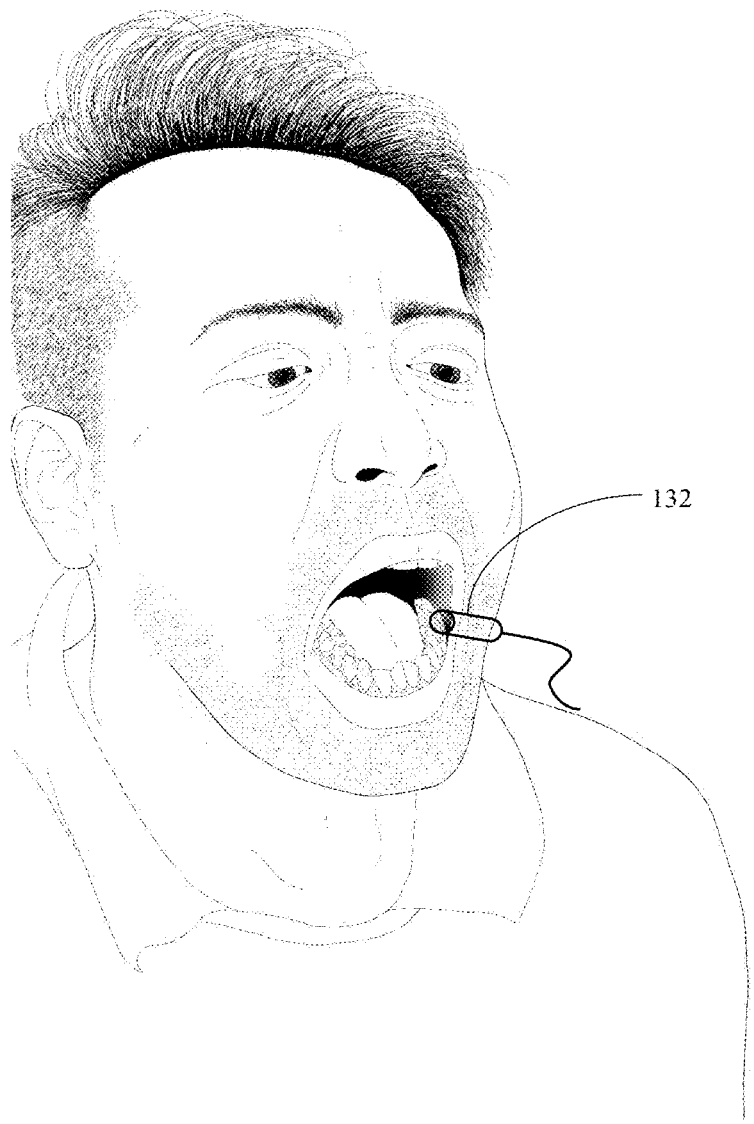
FIG. 3 illustrates an example position of a dental scanner for capturing a 3D image of one or more teeth in a dental environment.

FIG. 3 illustrates an image of a dental scanner, such as a camera, for capturing a 3D image of one or more teeth. The dental scanner 132 can be placed just near as well as inside the mouth of patient and focused on a targeted tooth. The camera should have a large enough view to capture images of the tooth preparation site at various angles in order to create a 3D model of the preparation or surgical site. The camera or digital scanner can also be used to enlarge the dental view of the tooth preparation site.

Figure 4:
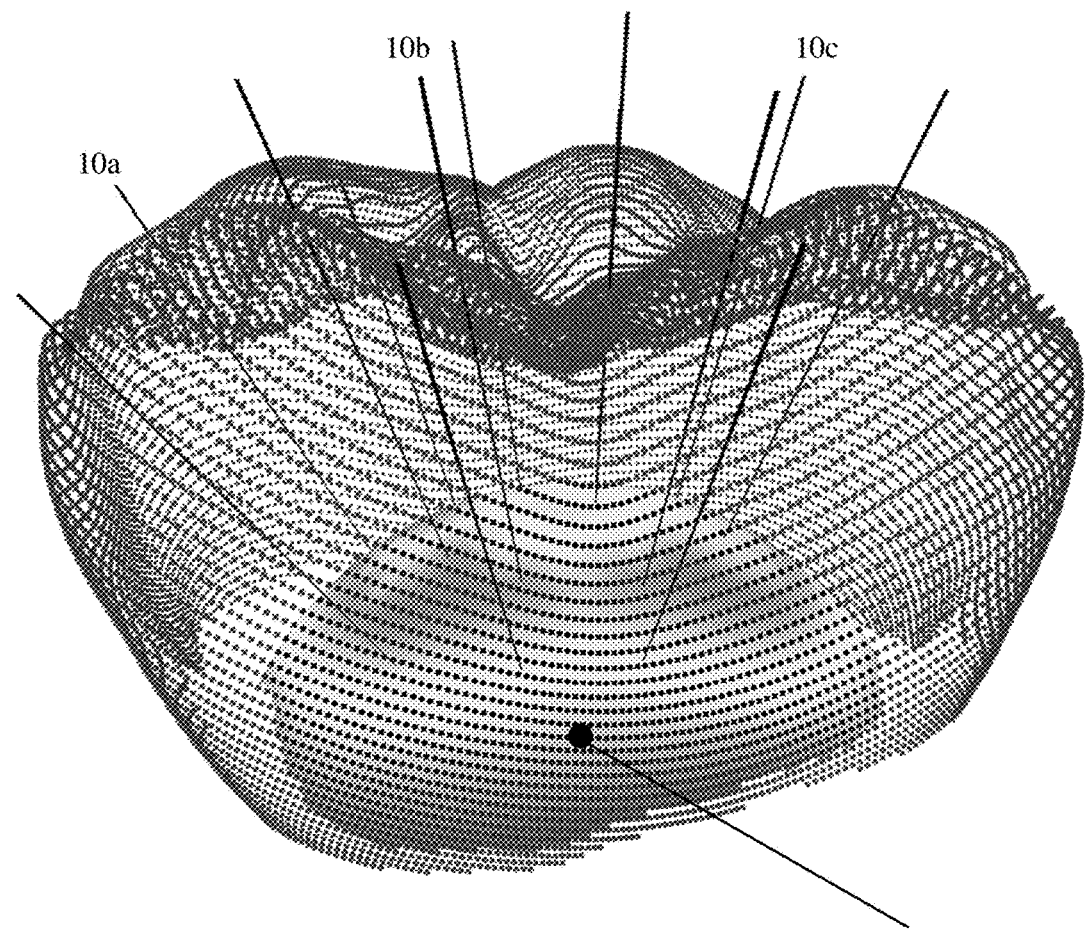
FIG. 4 illustrates a tooth having an assigned centroid with rays originating from the centroid.

FIG. 4 illustrates a tessellated image or mesh file representing a tooth. The image of the tooth has an assigned common centroid 12 serving as a reference locus with rays originating from the common centroid. The common centroid 12 is selected or assigned relative to the image of the tooth at an approximately central location, and the distance from the common centroid to each layer in the tooth can be indexed, mapped in a 2D format in a descriptor matrix, and the descriptor matrixes stacked such that they have a common centroid anchor or reference locus. To be stackable for describing 3D patterns, each surface around and including the tooth is described by a unique descriptor matrix, and all of the descriptor matrixes describing the same tooth in its dental environment have a common reference locus or centroid from which all measurements are taken. The stacked descriptor matrixes contain data related to distances from a particular surface to the shared common reference locus, and each data point in each of the stacked descriptor matrixes represents a distance from the common reference locus along the same indexing ray 10a, 10b, 10c describing a surface shape. The length of each particular indexing ray from the centroid 12 to the surface is stored in the same location in each surface descriptor matrix such that the set of descriptor matrixes describing the same tooth and features thereof are anchored in space relative to one another. The plurality of surfaces in and around the tooth are thus each described by a separate descriptor matrix, however in relation to the same common reference locus or centroid with each cell corresponding to a single indexing ray. Each data point in the same cell of related stacked matrixes is related along the same indexing ray as the distance between the reference locus and the surface described by each individual descriptor matrix. This provides a descriptor stack which describes multiple surfaces in and around the same tooth. The multiple related surfaces can include, for example, gumline, gum surface, neighbouring tooth surface, occlusal tooth surface on an opposite jaw to the dental object, arch surface, interior crown surface, post or abutment surface, exterior crown surface, and one or more appliance surface.

A plurality of features can thereby be described with a single descriptor matrix stack, where each matrix visualizes a single feature or single surface of the dental object. The paths of the indexing rays 10a, 10b, 10c extend from a single common centroid 12 point to the surface represented by the descriptor matrix. Indexing rays are extended from the common centroid 12 at evenly spaced angle intervals in all directions. Each time an indexing ray intersects with the surface of the mesh file describing the tooth or a related surface, the distance that the ray travelled is stored in a two-dimensional array representing all rays shot from the centroid. The tooth can be segmented in a few different ways to generate the set of 2D descriptor matrixes that describe the dental object, for example using parallel or radial slicing or by angular indexing. With a common centroid for each descriptor matrix, the set of matrixes are indexed relative to one another, enabling independent segmentation, searching, and optimization of the surface described by each descriptor matrix.

Figure 5:
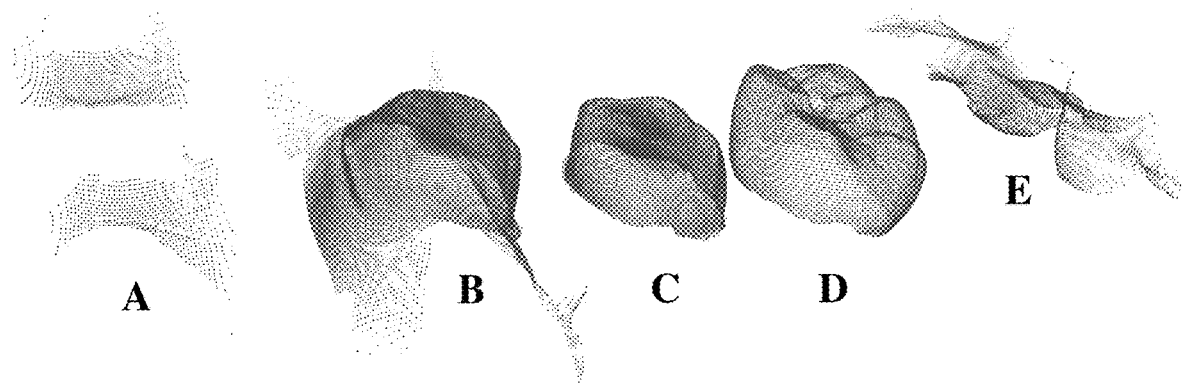
FIG. 5 illustrates a selection of tooth descriptor surfaces of a single tooth object described in relation to a common reference locus.

FIG. 5 illustrates a selection of tooth descriptor surfaces described in relation to a common reference locus. This figure illustrates that with this encoding method, 3D mesh representations of the dental object can be segmented into different features with each view related by a common reference locus or centroid such that they can be overlapped in space and independently searched and optimized. The features of a bottom jaw dental location illustrated are from left to right, where: feature A is the surface of a preparation site (adjacent tooth walls); feature B is the surface of the preparation site (the abutment); feature C is the inside surface of a fabricated crown (inside surface); feature D is the outside surface of the fabricated crown (outside surface); and feature E is the occlusal surface of neighbouring top teeth in the top jaw. In one application of the present invention a crown can be designed by matching the inside of the crown (feature C) to the patient's abutment (feature B), and independently designing the outside of the crown (feature D) to match the preparation site (feature A) as well as the occlusal surface (feature E), each with its own descriptor matrix. Computer-aided design (CAD) can be done by matching similar descriptor matrixes to the one being designed to a machine learning trained model to provide a complete crown and abutment design that fits into the patient's mouth, taking into consideration all aspects of the crown environment. The abutment design can be provided to the dentist in a visualized surgical preparative guiding tool and the matched crown can be easily manufactured from the designed crown together with the final abutment shape from the surgical preparation.

Figure 6:
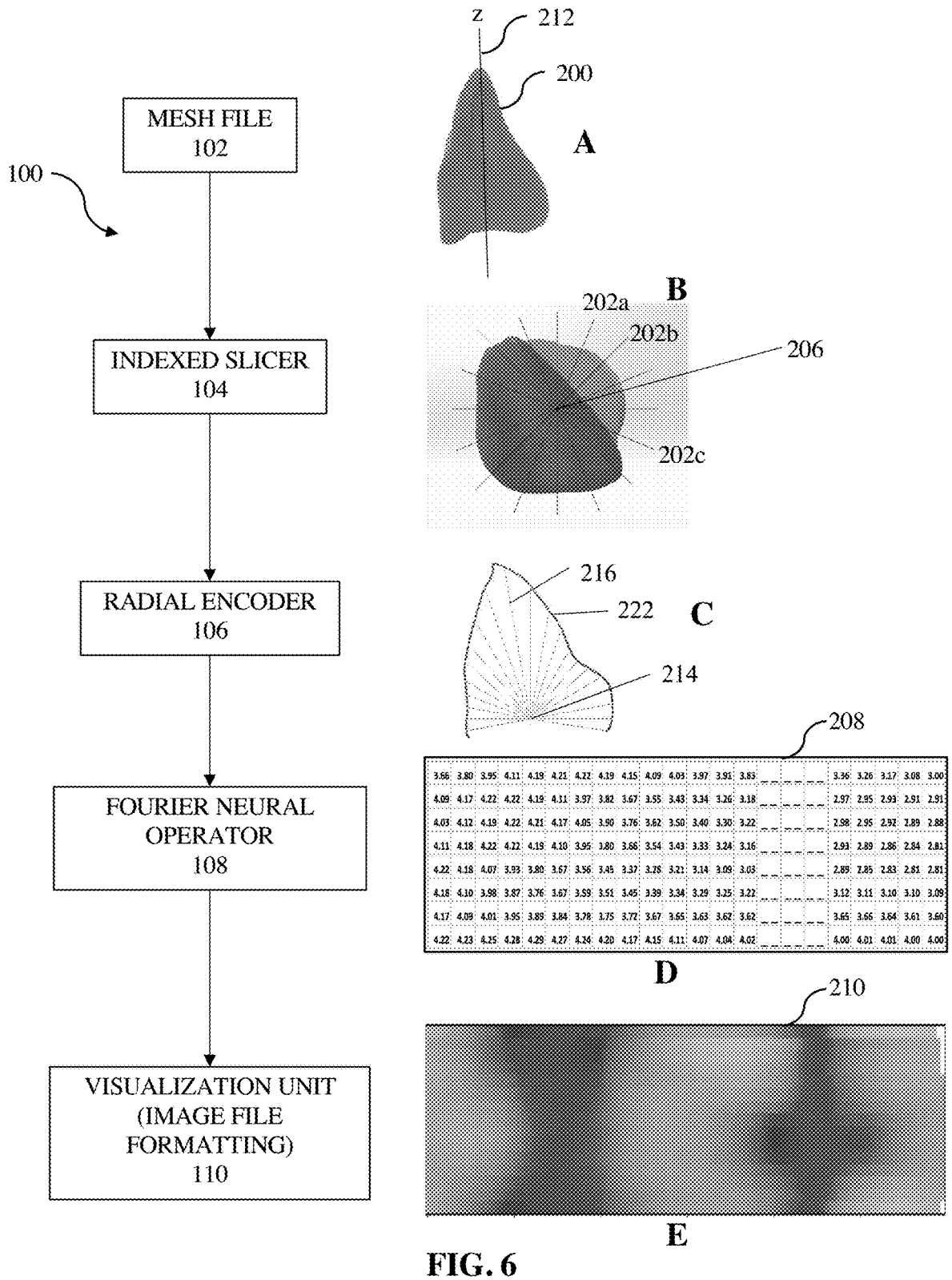
FIG. 6 illustrates an example of a tooth descriptor generation system to convert a 3D mesh file into a 2D matrix representation of the same surface.

FIG. 6 illustrates an example of a tooth descriptor generation system to carry out a dental file segmental method to convert a 3D mesh file representation of a tooth into a 2D matrix representation of the same tooth surface. The tooth descriptor generation system 100 comprises an indexed slicer 104, a radial encoder 106, a Fourier neural operator 108, and a visualization unit 110 for image file formatting. The indexed slicer 104 receives an STL or mesh file 102 as an input source and the Fourier neural operator 108 in the system 100 generates 2D descriptor matrix 208 output which can be visualized on a visualization unit 110. The terms "matrix" and "array" are used interchangeably herein to refer to the two dimensional data structure comprising numerical measurements represented in a two dimensional x, y array, where each numerical measurement is a distance from a common reference locus to a dental surface, a first x dimension of the first descriptor matrix comprises a number of the plurality of cross-section slices and a second y dimension of the first descriptor matrix comprising a number of the plurality of radial lengths in each slice. Each descriptor matrix may differ based on the surface it is used to describe, and the visualization unit 110 can optionally provide an output image on a graphical user interface on a display screen. The visualized output can simply be the array of numbers as shown adjacent Fourier neural operator 108, or can be a parsed output, for example where ranges of numbers are represented by colors or in greyscale, as shown adjacent visualization unit 110. The image output at the visualization unit 110 can be of any standard image file format capable of being visualized. Various different descriptor matrixes for a single dental object can be obtained, such as, for example, gumline, gum surface, neighbouring tooth surfaces, occlusal tooth surfaces adjacent to or on the opposite jaw of the dental object, arch surface, inside and outside of prosthetic surfaces, and appliance surfaces. The set of descriptor matrixes that provide a description of all relevant surfaces of and around a tooth are used to design an abutment surface based on the existing tooth, as well as the crown that will fit said abutment once the abutment has been surgically prepared.

A single tooth descriptor method is illustrated as images A-E in FIG. 6, where images A-E illustrate example outputs of components of the descriptor generation system 100 employing an example of a single tooth description method. This method comprises processing of three-dimensional single tooth files from their native 3D format into a two-dimensional (2D) descriptor matrix format shown as 2D descriptor matrix 208 in image D or further processed into a visualization map 210 shown in image E. Image A illustrates an example image of a tooth 200 in a native three-dimensional tooth file (e.g., mesh file format) aligned relative to a z-axis 212. The present method can be achieved by mathematically slicing the three-dimensional image of tooth 200 into equally angled slicing planes by the indexed slider 104 as shown in image B. To do this the 3D image representation of the tooth 200 is passed through the indexed slicer 104 where, in this embodiment, the 3D digital representation of the tooth 200 is sliced radially. In a preferred embodiment with radial slicing, each slice will pass through the dental object common centroid on the z-axis 212, however it is noted that slicing can also be done in, for example, parallel or near parallel planes, or using angular indexing.

As shown in image B, the image of the tooth is analyzed by the indexed slicer where, in the present example method, the digital 3D image of the tooth is sliced radially into a plurality of radial portions through the slicing centroid 206. In the embodiment shown, each radial slice will pass through the tooth common centroid or z-axis. As shown in image B, all radial slicing planes 202a, 202b, 202c that are generated have a consistently increasing angle alpha ($\alpha$) such that the difference in angle or degrees from one radial slicing plane to the next is the same. In some embodiments, increasing the number of radial slicing planes in the method will increase the accuracy of the descriptor generation such that the resulting 2D matrix provides more granularity on the 3D shape of the dental object. Radial slicing planes 202a, 202b, 202c that are generated are preferably equally angled to provide consistent density of distance data for the dental object surface. Each slicing plane 202a, 202b, 202c will generate a different cross-sectional view of the tooth 200 at a different angle.

Image C shows a 2D cross section of one slicing plane shown in image B. As shown in image C, the distance from the indexing centroid 214 to the intersection of each cross-sectional point or tooth cross sectional boundary 222 on the circumference of the tooth image slice, or the length of each indexing ray 216, is measured by the radial encoder. The indexing centroid 214 is the centroid of the cross-sectional plane of a single radial slicing plane generated from radial slicing of the tooth image through a radial slicing plane. The radial encoder will generate a plurality of indexing rays 216 originating at the indexing centroid 214, where the distance between the indexing centroid 214 and the circumference of the cross-section of the radial slicing plane at the edge of the dental object can be generated from the slicing plane is measured by the radial encoder 106 to map the circumference of the dental object in the slicing plane. In a radial slicing method, the slicing centroid 206 can also be at the same location as the indexing centroid of each cross-section generated from slicing plane 202a, 202b, 202c. The radial encoder 106 will generate indexing rays 216 from the indexing centroid 214 which maps the length of each indexing ray from the indexing centroid to the dental object cross-sectional boundary 222 in each radial slice. In some embodiments, all the indexing rays will be equally angled in space at an angle beta ($\beta$) such that the angle between each indexing ray 216 is constant. It should be noted that the cross section created by the indexed slicer 104 can also be measured and referenced from a different location or reference locus on the dental object, such as, for example, a bottom plane of the dental object instead of an indexing centroid as shown, producing a different orientation of the resulting descriptor matrix for the dental object at the described surface. Increasing the number of indexing rays generated will provide more detail about the tooth, for example the tooth anatomy, by capturing more data points around the tooth cross-section circumference. However, more circumferential data points as provided by the distances of the plurality of indexing rays will increase the 2D matrix file size, accordingly this should be kept in mind when determining the number of slicing planes as well as indexing rays required to provide adequate precision required for the desired purpose. To compare descriptor matrixes for the same tooth it is preferred that the location of the reference point for slicing as well as indexing including the incremental angles between indexing rays, also referred to as the algorithm used to create the descriptor matrixes, is consistent to enable straight-forward comparison of similar dental matrixes.

Image D illustrates an example of a radial encoder output of the Fourier neural operator 108 as a 2D descriptor matrix 208 for the tooth shown in images A and B. A 2D descriptor matrix 208 is generated for each radial portion or slicing plane 202a, 202b, 202c of the tooth dental object shown in image B. For each cross sectional slice or slicing plane the radial encoder measures the distance from the indexing centroid to the cross sectional boundary and generates a one dimensional list of distances (1D array) which describes the surface boundary for the particular slicing plane. This is repeated for every slicing plane, and combining all of the 1D arrays for each slicing plane will create the 2D descriptor matrix 208 of the tooth 200 using a Fourier neural operator. Other mathematical functions can also be applied to the 1D arrays or 2D descriptor matrix to manipulate the numbers present in those array to a manageable range, such as by reducing the number of significant digits or by normalizing the numbers. Applying a normalization function can also result in reduction of the data or file size of the 2D descriptor matrix 208. In an example, if the indexing centroid is placed a significant distance away from the dental object slice, the neural operator can adjust the values in the 1D matrix by normalizing the offset distance of the indexing centroid. In one specific example, array (102, 103, 101) can be normalized to be represented by array (2, 3, 1) with a base of 100. The 1D array (2, 3, 1) consumes less space as compared to (102,103,101) bytewise, but normalization of the values has not decreased the accuracy of the matrix. One open source method that can be used for such value normalization is Apache Parquet. It should be understood that a full matrix describing a whole tooth in its dental environment may have many rows and columns, potentially on the order of hundreds or thousands of rows and columns to provide sufficient granularity for the entire anatomy of the tooth. The data in the 2D descriptor matrix represents the actual distance, for example in mm or microns, and the smallest number from all the numbers in the 2D descriptor matrix can be removed through normalization, such that the 2D descriptor matrix represents the relative difference or dental variation present in the mesh file. As will be shown, each entry in the 2D descriptor matrix may be used as a pixel value in a visualization mapping/image. In some embodiments, the number of rows is equal to the number of slicing planes generated from the indexed slicer 104 and the number of columns is equal to the number of ray lengths generated in each slicer in the radial encoder 106. Each element or cell in the 2D matrix represents a distance from the indexing centroid 214 to a cross-section boundary point of that indexing ray on the slicing plane. The output of the Fourier neural operator is the 2D descriptor matrix 208 which can further be used in stacking applications as described below.

Image E in FIG. 6 is an illustration of a visualization map 210 of the radial encoder output 2D matrix 208 visualized as a pixel array. The visualization map 210 of the radial encoder 106 output can be visualized on a graphical user interface, where each entry in the 2D matrix 208 is converted to a pixel value, referred to herein as a visualization map 210. Image E illustrates an example of a greyscale (black and white range) visualization mapping of matrix 208, however it is understood that the same can be displayed in color as desired. The visualization mapping and/or 2D matrix can then be converted back into a 3D representation of the tooth and displayed on a graphical user interface during the dental procedure. The speed at which updates can be calculated and presented is obtained using data compression using the method as described. The present system and method can thereby generate two-dimensional 2D descriptor matrixes for 3D objects by the conversion of mesh files into descriptor matrices and comparing and matching said descriptor matrixes to provide guidance on abutment design during surgical preparation.

Figure 7:
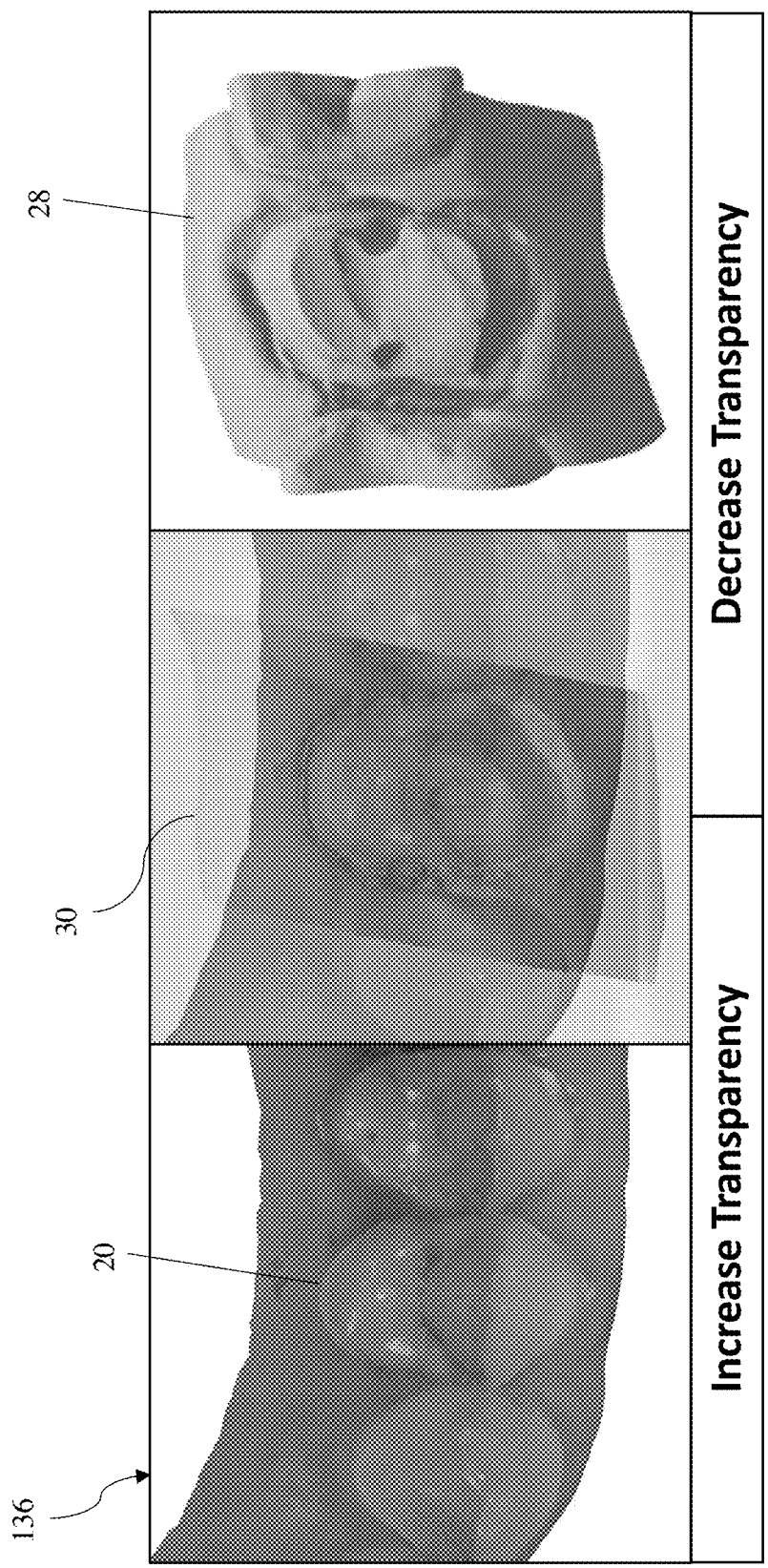
FIG. 7 is an example of a graphical user interface display showing a target abutment overlayed with a tooth as scanned with an overlay image.

FIG. 7 is a schematic diagram illustrating an example of a user interface dentist display showing the target abutment overlayed with a tooth as scanned. The dentist display 136 is presented on a graphical user interface to the dentist during the surgical preparation procedure for creating an abutment. An image of the tooth for shaping 20 is presented as the output image of a dental scanner, such as a camera, and is preferably provided as a 3D image which can be rotated in space on the display on the graphical user interface to provide the dentist with guidance on where on the tooth shaping is desired. Also shown is an image of the target abutment 28 to show the goal of the tooth preparation once the abutment has been created from the tooth by shaping and shaving. The shaving and shaping surgical procedure is generally done by a dentist using one or more dental drills and a variety of dental burrs used to remove material from the tooth to create the abutment. An output showing a blended image 30 or image overlay of the target abutment and the tooth as scanned is presented to the dentist to illustrate how and where shaping is required to have the tooth as scanned match the target abutment 28. Blending can be done using an image blender algorithm.

A first scan the tooth for shaping 20 is compared to the target abutment 28 before the tooth has been shaved by the dental drill during surgery. The dentist then begins work to shave the tooth to create the abutment and successive images of the tooth for shaping 20 can be obtained from the dental scanner. The captured image data is then converted to create a compressed 2D descriptor matrix representation as described such that the image of the tooth for shaping 20 can be aligned with the target abutment 28 to create the blended image 30, which is an overlay of the tooth for shaping 20 aligned with the target abutment 28. Alignment of the tooth for shaping 20 and the target abutment 28 can be easily done by the alignment along the z-axis of the tooth for shaping 20 and the target abutment 28 in the matrix representation which is built into the dental file segmentation method to create each of the 2D descriptor matrixes for each of the tooth surfaces. As the surgical procedure to prepare the abutment progresses, updated images can be taken of the tooth being shaped and the dental display updated to provide real time guidance to the dentist for surgically creating the abutment. At a system level to provide this real time graphical feedback, a dental file segmentation method is carried out on the 3D image of the tooth obtained by the dental scanner in order to provide the rapid surface analysis and alignment. To do this, the system works in a cycle, taking input from the dental scanner to update the image of the tooth for shaping at each cycle. The dentist display can further provide the option of changing the transparency of the abutment and tooth for shaping to enable the dentist to more clearly visualize the difference between the tooth being altered and the target abutment.

Figure 8:
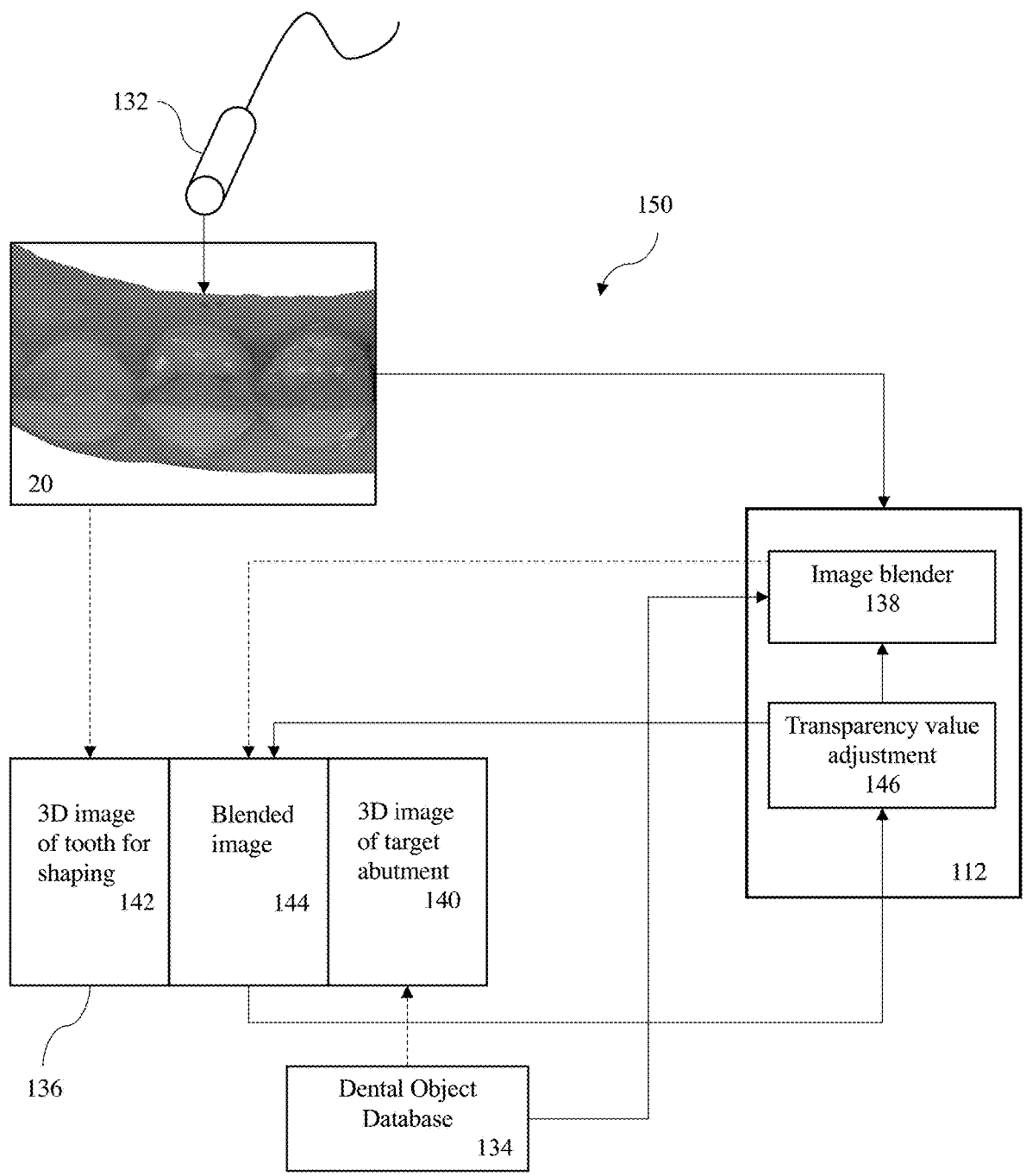
FIG. 8 is a system diagram of a visualization system illustrating generation of a dental display on a graphical user interface during guided surgical preparation.

FIG. 8 is a system diagram of a visualization system 150 illustrating generation of a dental display during guided surgical preparation. At the start of a dental procedure for preparing an abutment, dental scanner 132 obtains multiple 2D images of a tooth from various angles, including image data on surfaces in the tooth environment such as gum surface, adjacent tooth surfaces, and opposing teeth occlusal surfaces. Software is then used to convert the multiple 2D images into a 3D image of the tooth for shaping 20, and then into a 3D tessellated mesh image of the tooth. Various ways are known in the art for converting a 3D mosaicked image or 3D image into an STL mesh file. The present system then converts the 3D mesh file of the tooth including the other surfaces in the tooth environment into one or more 2D descriptor matrixes as described herein. The one or more 2D descriptor matrix is then compared to other 2D descriptor matrixes in a dental object database 134, the database comprising linked 2D descriptor matrixes and 3D dental image data, wherein at least some of the 3D dental image data is stored as 2D matrixes. A target abutment is selected by matching the tooth for shaping 20 to a similar tooth in the dental object database 134 using descriptor matrix matching, and bringing forward an abutment that is linked to the identified similar tooth. A suitable abutment is selected based on multiple considerations, including but not limited to similarity of the gum surface, abutment surface, tooth and teeth surfaces, occlusal surfaces in the mouth, crown shape, crown material, tooth shape, tooth location, abutment margin line, gum line, tooth occlusal surface, crown method of manufacture, and tooth environment. The target abutment is the desired abutment shape for the tooth which will be receiving a crown. To identify a suitable target abutment and bring forward a 3D image of the target abutment 140, the abutment is selected from a dental object database 134 comprising a plurality of abutment shapes, preferably tagged by tooth location or tooth number. The abutment shapes are recreated from 3D image files and converted into 2D matrix files using an encoding scheme as described.

The visualization system 150 links and displays a 3D image of the tooth for shaping 142, both before or during the procedure to form the abutment, and the 3D image of target abutment 140 so the dentist can see both simultaneously, as well as the overlay blended image 144 between the actual tooth and the target abutment. The dentist can also adjust the transparency of both images to see either just the targeted abutment or just the actual abutment, or somewhere in between. This feature assists the dentist to visualize where they are in the tooth preparation procedure and how much more tooth material needs to be removed to prepare the abutment. The visualization system runs in loops to make sure that any changes in the 3D image of the tooth for shaping are recorded and displayed, and that the required area on the tooth for removal is updated during the procedure. To do this, a descriptor generation system 112 changes the file format of the 3D image of the tooth and surrounding environment into one or more 2D feature matrix such that it can be compared quickly to the target abutment as described herein.

The descriptor generation system 112 comprises an encoder with core processing steps of the encoder comprising an indexed slicer, radial encoder, Fourier Neural Operator and optional visualization unit to visualize the output image file format. Once the descriptor generation system 112 has encoded the 3D image of the tooth into a 2D descriptor matrix file format the output matrixes can be stacked to facilitate the representation of all of the dental features describing the surfaces around the tooth into a single 2D matrix. For each tessellated 3D image given to the descriptor generation system 112, the index slicer slices dental anatomy into slices so that a cross section can be generated which can further be used in radial encoder where it maps the cross section from a particular assigned slicing centroid or locus. With sufficient number of scans of the tooth the system can also operate on a cycle mimicking a video-style output and provides the dentist with a real time update how much additional abutment shaving is required. The image of the tooth for shaping 20 is then displayed on the dentist display 136 on a graphical user interface. The same image goes to an image blender 138 which carries out an image blender algorithm to take the two images of the tooth for shaping and the target abutment and their corresponding transparency values. The image blender algorithm takes camera input and the transparency values desired and provides an output blended image for display as a blended image 144 on the dental display 136. One or more of a button, tab, slider, wheel, or digital adjustment mechanism representation thereof can be used to provide a transparency adjustment 146 control to the dentist during the abutment preparation procedure.

Figure 9:
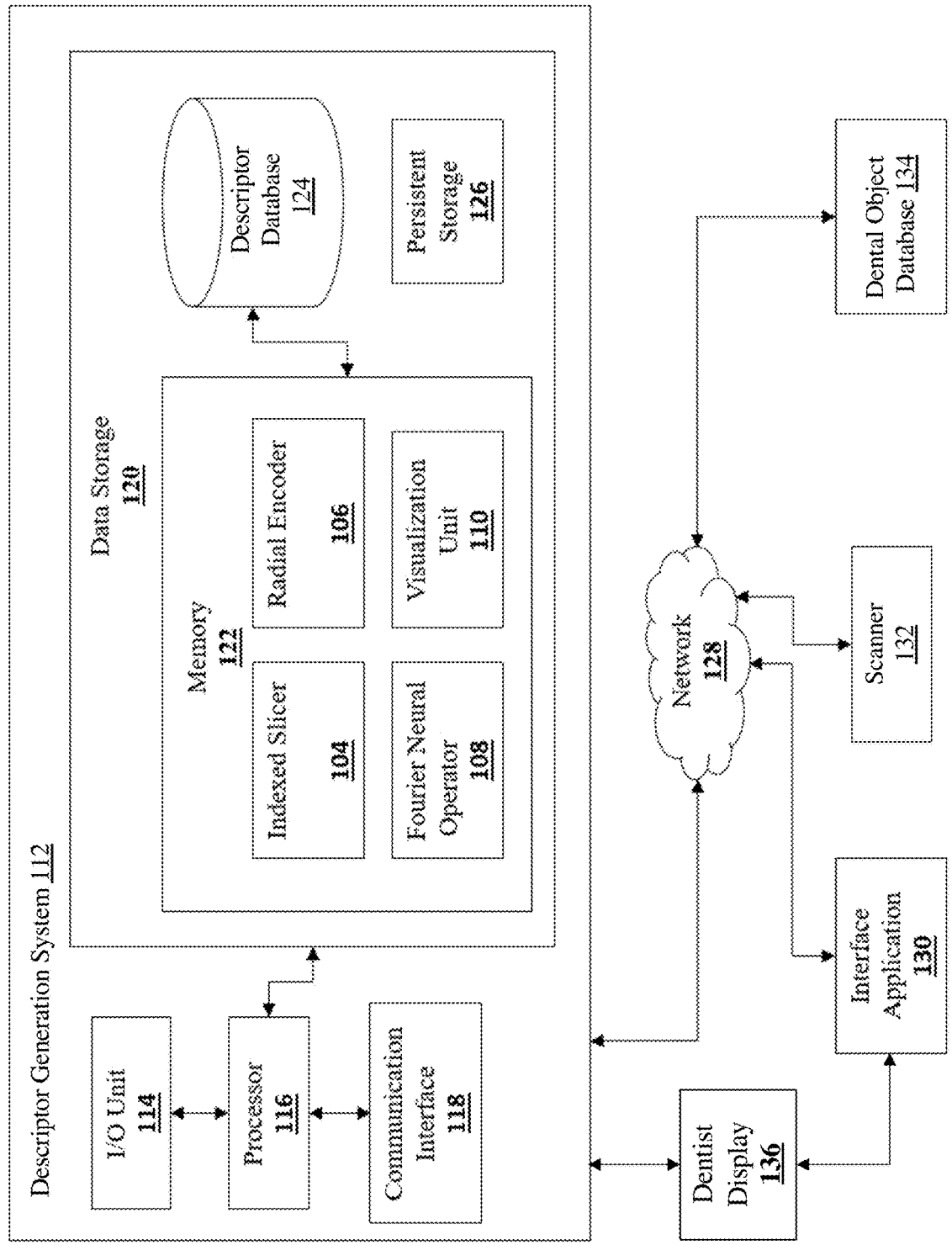
FIG. 9 is a schematic diagram illustrating an example of a descriptor generation system in accordance with some embodiments.

FIG. 9 is a schematic diagram illustrating an example of a descriptor generation system 112 in accordance with some embodiments. The system comprises at least one processor and a memory storing instructions which, when executed by the at least one processor, configure the at least one processor to perform the method as presently described. The descriptor generation system 112 is implemented on a computer or equivalent electronic device connected, either wired or wireless, to an interface application 130, a dental scanner 132 such as a dental imaging device that produces STL/mesh images, and one or more dental object databases 134 such as dental records or other data, via network 128. The interface application 130 can be, for example, a dental assessment interface application on a personal computer, a dental assessment device interface, or a mobile device application, generally comprising a graphical user interface, which enables a dental professional to interact with the system. The descriptor generation system 112 can implement aspects of the processes and methods described herein. The descriptor generation system 112 can be implemented on a suitable computer or electronic device and can include an input/output (I/O) unit 114 and a processor 116 using a communication interface 118 and a data storage 120. The descriptor generation system 112 also has a memory 122 storing machine executable instructions to configure the processor 116 to receive files, for example from Input/Output (I/O) unit 114, one or more dental scanner 132 device, or from one or more descriptor databases 124. The dental descriptor database 124 can, for example, be a database comprising a plurality of dental descriptor mesh or mesh files and/or matrix data files that can be called upon for matching, comparison, diagnostic, artificial intelligence or machine learning training or testing sets, or for other comparative purposes.

The descriptor generation system 112 can also include a communication interface 118, and data storage 120. The processor 116 can execute instructions in memory 122 to implement aspects of processes described herein. The descriptor generation system 112 can connect with one or more interface applications 130, dental scanner 132 devices, or dental object databases 134. This connection may be over a network 128 (or multiple networks), either wireless or wired or a combination thereof. The descriptor generation system 112 may receive and transmit data from one or more of these via I/O unit 114. When data is received, I/O unit 114 transmits the data to processor 116. The I/O unit 114 can enable the descriptor generation system 112 to interconnect with one or more input devices, such as a keyboard, mouse, camera, touch screen and a microphone, and/or with one or more output devices such as a display screen and a speaker. The processor 116 can be or comprise, for example, one or more of any one or more type of general-purpose microprocessor or microcontroller, for example, digital signal processing (DSP) processor, integrated circuit, field programmable gate array (FPGA), a reconfigurable processor, or any combination thereof. The data storage 120 can include memory 122, one or more dental descriptor database (s) 124 containing a plurality of dental object 2D matrix representations along with their descriptor class/subclass, and one or more persistent storage 126. Memory 122 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The communication interface 118 can enable the descriptor generation system 112 to communicate to the network 128 as well as with other components, to exchange data with other components, to access and connect to network resources, to serve applications, and/or perform other computing applications by connecting to one or more network or multiple networks capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these. The descriptor generation system 112 can also be operable to register and authenticate users using, for example, a login, unique identifier, and password, prior to providing access to applications, a local network, network resources, other networks and network security devices. The descriptor generation system 112 can also be enabled to connect to different machines or entities over one or more communication interface 118. The data storage 120 may be configured to store information associated with or created by the descriptor generation system 112. Storage 120 and/or persistent storage 126 may be provided using various types of storage technologies, such as solid state drives, hard disk drives, flash memory, and may be stored in various formats, such as relational databases, non-relational databases, flat files, spreadsheets, extended markup files, etc. The memory 122 may also include the indexed slicer unit 104, the radial encoder unit 106, the Fourier neural operator 108, and the visualization unit 110 as described herein.

Figure 10:
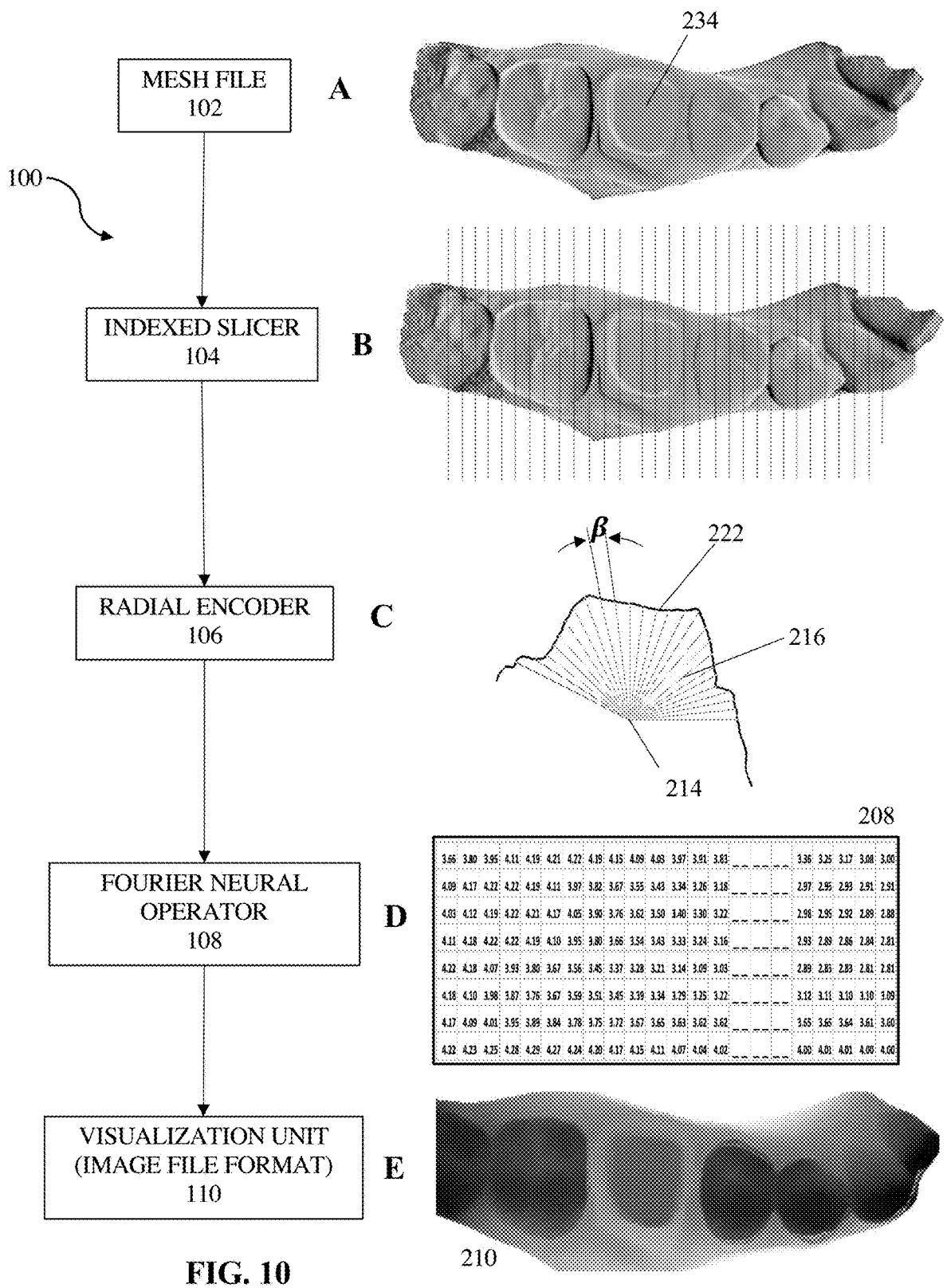
FIG. 10 illustrates an example of dental file segmentation in a method of creating a tooth descriptor matrix.

FIG. 10 illustrates an example of dental file segmentation in a method of creating a tooth 2D descriptor matrix, including outputs of components of the descriptor generation system 100. This method processes a three-dimensional dental from its native 3D format to a 2D format. The term "bitewing" is generally used if the dental object is three to five teeth together, and the term "quadrant" can be used if the dental object is half or almost half of the dental arch. The same notation applies to both upper and lower anatomy. Step A illustrates the quadrant in an STL or mesh file format 102 of a bitewing comprising an abutment 234. In Step B, slices are generated by indexed slicer 104 to slice the bitewing into a plurality of cross-sectional slices. Each slice is approximately equally spaced, and an increase in the number of slices or slicing planes improves accuracy of the resulting 2D matrix representation of the 3D image of the bitewing. Each slicing plane will generate a cross-section view of the bitewing. In a parallel slicing plane method as described it can be understood that each slicing plane intersects a reference locus placed an infinite distance from the dental object such that each slicing plane is substantially parallel to all other slicing planes.

Step C shows an example of a radial encoding method for the abutment 234. The distance from an indexing centroid 214 for each slicing plane to endpoints along the perimeter of the cross-sectional boundary 222 view of the abutment are measured by the radial encoder 106. The indexing centroid 214 is the centroid of the cross-section generated from the slicing plane. The radial encoder 106 will generate the indexing ray 216 segments which map the distance from the cross-sectional boundary 222 to the slicing centroid 214 in the cross section. In some embodiments, all ray segments will be approximately equally angled in space at an angle beta (ß). It should be noted that the cross section created by the indexed slicer 104 can also be measured from the bottom plane as the indexing centroid or reference locus, in other words the beta angle can be effectively infinite. The higher the number of indexing ray segments that are generated, the better the details about the tooth anatomy will be. However, file size requirements may result is limiting the number of ray segments.

In Step D a descriptor matrix 208 is generated from the radial encoding by the Fourier neural operator 108. An example of the Fourier neural operator 108 for the bitewing shown in step B is shown as descriptor matrix 208. Only some of the matrix values for the portion of the bitewing in B is shown in descriptor matrix 208 for ease of presentation. It should be understood that a full matrix may have many rows and columns to provide sufficient granularity for the entire anatomy. Each entry in the matrix may be used as a pixel value to create a visualization map 210 using a visualization unit 110 as shown in E to assist dentists and/or lab technicians for further analysis. The descriptor matrix 208 can also be visualized and values of the Neural operator descriptor matrix 208 may be mapped to rainbow colour, black and white shading, or any other colour mapping method. In some embodiments, the number of rows is equal to the number of slicing planes generated by the indexed slicer 104, and the number of columns is equal to the number of ray lengths generated in each slice by the radial encoder 106. Each element of the matrix represents the distance from the indexing centroid to the cross-section boundary of that slice. The output of the Fourier neural operator 108 is the descriptor matrix 208 which can further be used in stacking applications to describe multiple surfaces relative to the dental object, such as gum, occlusal, and adjacent dental surfaces. The values in descriptor matrix 208 can be represented as shading shown in visualization map 210. A full descriptor matrix would correspond to the entire visualization mapping/image such that each conversion of a matrix entry to a colour/shading may be represented as a pixel in the visualization map 210 image.

Figure 11:
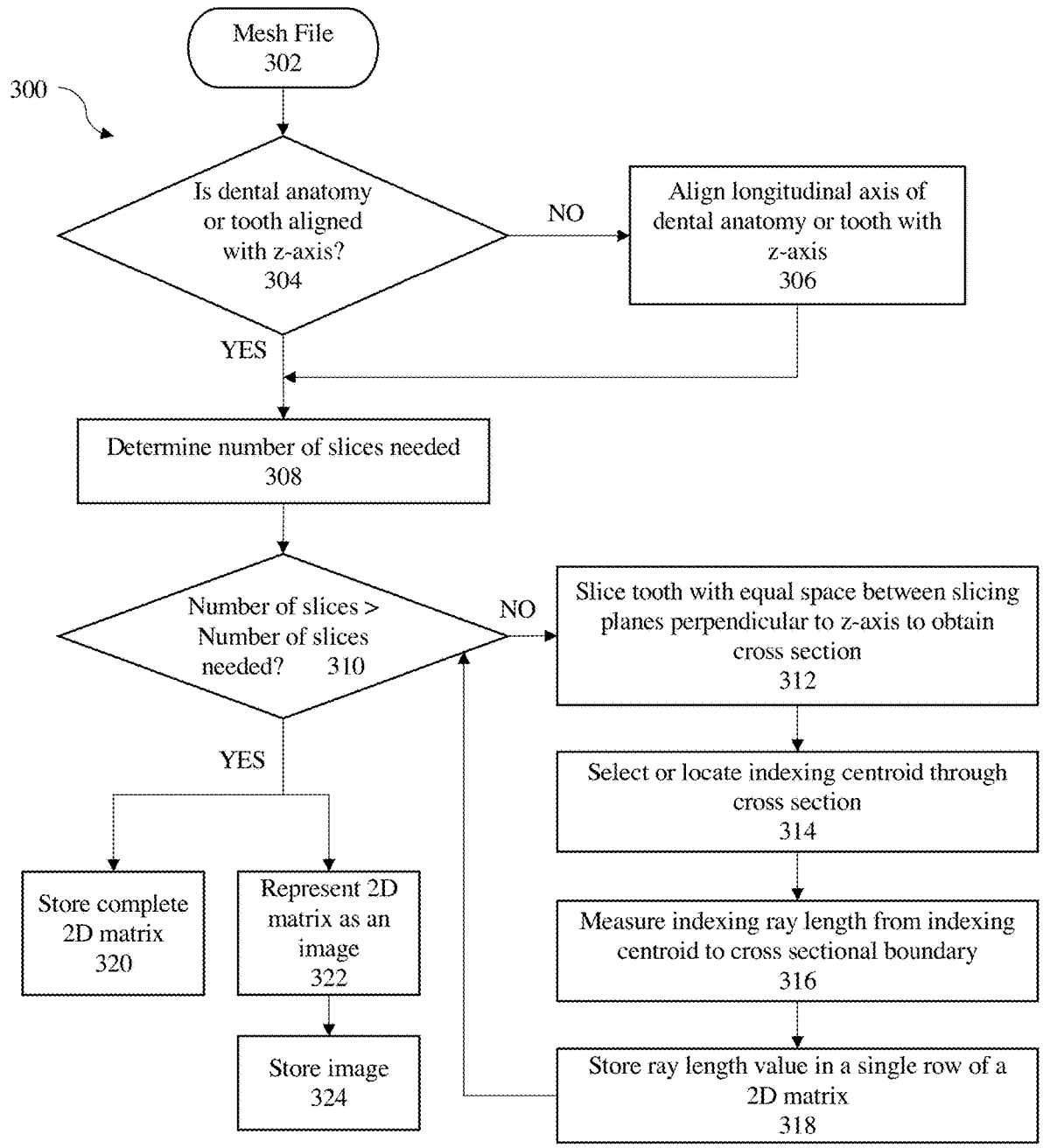
FIG. 11 illustrates a flowchart of an example of a method of generating a tooth descriptor matrix.

FIG. 11 illustrates a flowchart of an example of a method of generating a tooth descriptor matrix 300. The method 300 begins by taking a three-dimensional mesh file 302 as an input. The mesh file 302 representing a dental anatomy such as a tooth, quadrant, arch, or bitewing, is a triangulated representative of the 3D image of the quadrant file. The system queries whether the dental anatomy or tooth is aligned with the z-axis of the image 304, and if not, the z-axis of the mesh file is aligned with the anatomy's longitudinal axis 306. In some embodiments, the system automatically aligns the dental anatomy's longitudinal axis to the z-axis. For example, the system may generate a transformation matrix which moves the center of a bounding box of the input STL or mesh file 302 to the origin. This aligns the dental anatomy's longitudinal axis with the z-axis 306. The number of slices needed to make sure all features are covered is determined 308. For example, if the number of slices are too few, then the space between slices may be large enough so that their cross-sections do not show an anomaly or feature of the anatomy. This step of determining the number of required slicing planes 308 determines the quality of the 2D descriptor matrix datafile produced by the method, and its accuracy relative to the original image file of the dental object.

A recursive loop is then entered based on recursive slicing the dental object, here an arch or bitewing, along a plurality of slicing planes, each slicing plane having an incremental distance to the next slicing plane, until the number of slicing planes or slices reaches the desired number. If the number of slices is not greater than the number of slices needed 310 then the dental anatomy or tooth is sliced at approximately equal spacing, as a plane normal to the z-axis 312 to obtain a cross-section view for each slice. In this example, the dental anatomy or tooth is sliced with equal space between slicing planes perpendicular to z-axis to obtain a cross section 312. The slicing operation can go from left to right, right to left, or in any other reasonable direction through the dental object. One reason for standardizing the slicing algorithm for a particular class of dental descriptors is to provide a basis for comparison or anchoring of the resulting 2D descriptor matrix to other 2D descriptor matrices with the same descriptor in a descriptor database.

Next, for each slicing plane, an indexing centroid is selected or located for each cross-section 314, and for each cross-section or slice, a plurality of indexing rays are assigned from the indexing centroid to the cross-sectional boundary of the slicing plane, and each indexed ray length is measured from the indexing centroid to the cross sectional boundary 316. The radial or indexing ray lengths between the indexing centroid and a cross-sectional boundary point on the slicing plane are measured in a clockwise or anti-clockwise direction, with an increasing beta angle between each indexing ray. It should be noted that the same features can be obtained with the anti-clockwise direction as a clockwise direction; the only difference is it will be in opposite direction as compared to one obtained from clockwise direction, at an approximately equal beta angle. As previously mentioned, standardization of the algorithm for converting the dental object into a 2D descriptor matrix file enables easier comparison and matching between 2D matrix files in the same descriptor class. The output measured ray length values for each slicing plane can then be stored as a single row unit 318 in a 2D descriptor matrix. By running this loop (steps 310 to 318) single row units for each slice can be obtained and stored in the 2D descriptor matrix datafile format one after another. This resulting 2D descriptor matrix may be stored 320 for example in a matrix database with other 2D matrices of dental objects. The same or similar method of generating a 2D matrix descriptor of a dental object may be performed for any another tooth anatomy or dental object, for example a single tooth such as a targeted incisor, molar, or premolar three-dimensional teeth.

The 2D matrix may be visualized or converted into an image 322, for example by setting color or hue values for each range of numerical indexing ray length values, and the same can be stored 324 in an image file format. A visualization or image representation of the 2D matrix may be generated, for example, by representing the maximum and the minimum values in the 2D matrix to chosen color or shading extreme values and saving the image file corresponding to the 2D matrix of the dental object. A full matrix would correspond to the entire visualization mapping/image such that each conversion of a matrix entry to a color and/or shading may be represented as a pixel in an image visualization map. The image file format is not limited to any single file format and can be stored in an image repository, which can be in the same or different location as where the related 2D matrix is stored. The dental object database may also be linked with or connected to the image repository.

FIG. 12A-C illustrate an example method of converting a mesh file of a tooth abutment into a 2D descriptor matrix during or after the dental procedure for rapid matching, comparing, and visual overlay. FIG. 12A illustrates an example z-axis 212 position for the abutment 234 and the alignment of the abutment. Aligning the abutment to the z-axis helps ensure that the surface measurement data that describes the abutment in 3D space is collected and stored uniformly. When the tooth is sliced in parallel each slicing plane can be arranged normal to the z-axis with the indexing reference locus placed at a reference location relative to the intersection of the z-axis and each slicing plane. Accordingly the z-axis can serve as a common reference locus for each slicing plane and there is no need to locate a single common centroid for the dental object as a whole.

FIG. 12B illustrates the indexing of one cross section plane of an abutment 234 which serves as a crown post at a near indexing centroid 214 with a plurality of indexing rays 216. In this example, measurements of lengths of each indexing ray 216 are taken from a near indexing centroid on the slicing plane to the abutment cross sectional boundary at a plurality of beta (13) angles. This provides a plurality of indexing rays each with a length describing the cross sectional boundary surface at the particular slicing plane.

FIG. 12C illustrates the indexing of one cross section plane of a crown post or abutment 234 at a far indexing centroid serving as the reference locus. In this method each slicing plane is processed by an indexing centroid positioned at a relatively infinite distance from the abutment or tooth inside a bounding box. By positioning the indexing centroid far from the tooth at an effectively infinite beta angle, the indexing rays 216 defined by from the indexing centroid to the cross sectional boundary of the dental object in the slicing plane will be substantially parallel and the array value mapping can be done from the bottom of the bounding box. In addition, the length of the indexing rays will be longer than if the centroid is closer to the tooth or dental object. Distances can then be normalized for easier processing using a Fourier neural operator or other normalization procedure. As such, instead of slicing radially, the tooth or abutment 234, for example, may be sliced in a parallel manner as shown, and the ray length distances can be recorded in the 2D matrix as starting from the bottom of the bounding box or at a reference plane 240. Other ways that can be used change the centroid position target the different dental anatomy features like margin, occlusal plane, etc. Preferably all substantially parallel slices that are generated will be approximately equally spaced to provide consistency and continuity across the resulting 2D matrix representations of the tooth or dental object. If the dental object or anatomy is sliced in parallel, there is no need to locate a teeth centroid and the z-axis can serve as the reference locus. However, consistency in parallel slicing with regard to distance between slicing planes is preferred such that the dental file segmentation algorithm used is consistent across dental objects having the same descriptor classification so that similar dental anatomy can be compared. The more slices are done then the better the accuracy of the 2D matrix that can be achieved, however the more data is collected, as each slicing plane generates its own unique cross-section view and results in an individual row in the 2D descriptor matrix. As such, the algorithm for converting a 3D mesh image of the tooth or dental object into a 2D descriptor matrix must be tailored to provide a balance between data file size and surface feature granularity and accuracy.

FIGS. 13A-C illustrate an example descriptor generation method for encoding a bitewing or dental arch. The selected reference locus for slicing the bitewing in 2D matrix descriptor generation in this example is a slicing centroid which is peripheral to the bitewing. One particular use case for this method is in a bite pattern recognition which can be used in conjunction with crown design. In a bite analysis a mesh file of the bitewing or dental arch is obtained using, for example, occlusal radiography, where the upper and lower bitewings are images in relation to one another and a single mesh file image is recreated which has the top and lower bitewings positioned as they would be during an occlusal interaction. This method is related processing of a three-dimensional dental arch file from its native 3D format to a 2D format. This method can also function with different dental anatomies such as a bitewing or a quadrant.

FIG. 13A illustrates an example of a bitewing with a slicing centroid peripheral to the bitewing. In this case, the bitewing is sliced radially to produce a plurality of slicing planes 220. In this embodiment each slicing plane 220 passes through an arch centroid, which in this case is outside and at a distance from the dental object. Each slicing plane 220 generated by the indexed slicer is at an approximately equal alpha ($\alpha$) angle to the next slicing plane. Increasing the number of slices increases the accuracy of the resulting 2D descriptor matrix for the bitewing. For each slicing plane 220 a cross-sectional view is generated, and the distance from an indexing centroid to endpoints of the perimeter of the cross-section view, or the cross sectional boundary, are measured by a radial encoder (shown in FIG. 12B). The radial encoder will generate the ray segments which maps the distance from the cross sectional boundary of the dental object in each slicing plane 220 to the indexing centroid. In some embodiments, all ray segments will be approximately equally angled in space, meaning that the angle between each indexing ray is constant, however this is not necessary as previously described. In particular, the cross section created by the indexed slicer can also be measured from a bottom plane or indexing plane at a distance away from the slicing plane to provide a substantially infinite beta angle. The greater the number of indexing ray segments that are generated, the better the details about the tooth or dental object anatomy will be, however, file size requirements may result in limiting the number of indexing ray segments. The greater the number of ray segments that are generated, the better the details about the tooth anatomy will be, however file size requirements may result in limiting the number of ray segments, and standardization of the dental file segmentation algorithm across all patients facilitates matching of similar matrixes in the descriptor database.

FIG. 13B is an example of an output 2D descriptor matrix 208 of the bitewing shown in FIG. 13A. The 2D descriptor matrix 208 may be generated from the radial encoding by the Fourier neural operator as described. It should be understood that a full matrix may have many rows and columns, on the order of hundreds or thousands, to provide sufficient granularity for the entire dental object anatomy. The output of the Fourier neural operator is the 2D descriptor matrix 208 which can further be used in stacking applications where multiple descriptor matrixes are anchored in space.

FIG. 13C illustrates an example of a matrix visualization of the 2D descriptor matrix using black/white greyscale mapping to provide a visualization map 210. Only the matrix values for the matrix portion shown in the visualization map 210 is shown in 2D descriptor matrix for ease of presentation. Each entry in the matrix may be used as a pixel value in a visualization map 210 of the 2D descriptor matrix. In some embodiments, the number of rows is equal to the number of slicing planes generated by the indexed slicer, and the number of columns is equal to the number of ray lengths generated in each slice by the radial encoder. Each element of the matrix represents the distance from the slicing centroid to the cross-section boundary of that slice. The values in each descriptor matrix may be mapped to rainbow colour, black and white shading, or any other colour mapping method. The minimum and maximum values of the 2D matrix may be identified and assigned to the selected colour map value extreme points to generate the colour map. A full matrix would correspond to the entire visualization mapping or image such that each conversion of a matrix entry to a colour/shading may be represented as a pixel in the visualization map 210.

Figure 14:
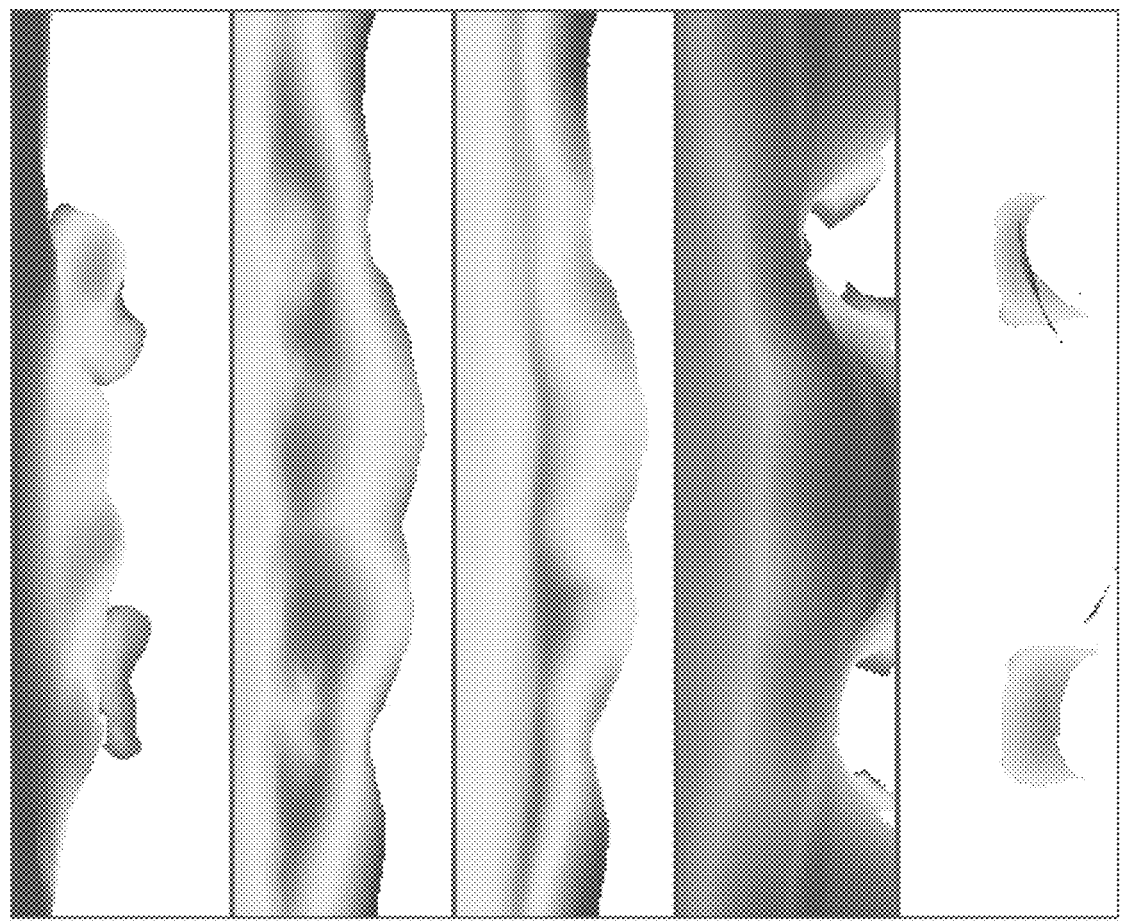
FIG. 14 illustrates a selection of tooth descriptor surfaces and colorized matrix visualization of an abutment and crown described in relation to a common reference locus.
Figure 14:
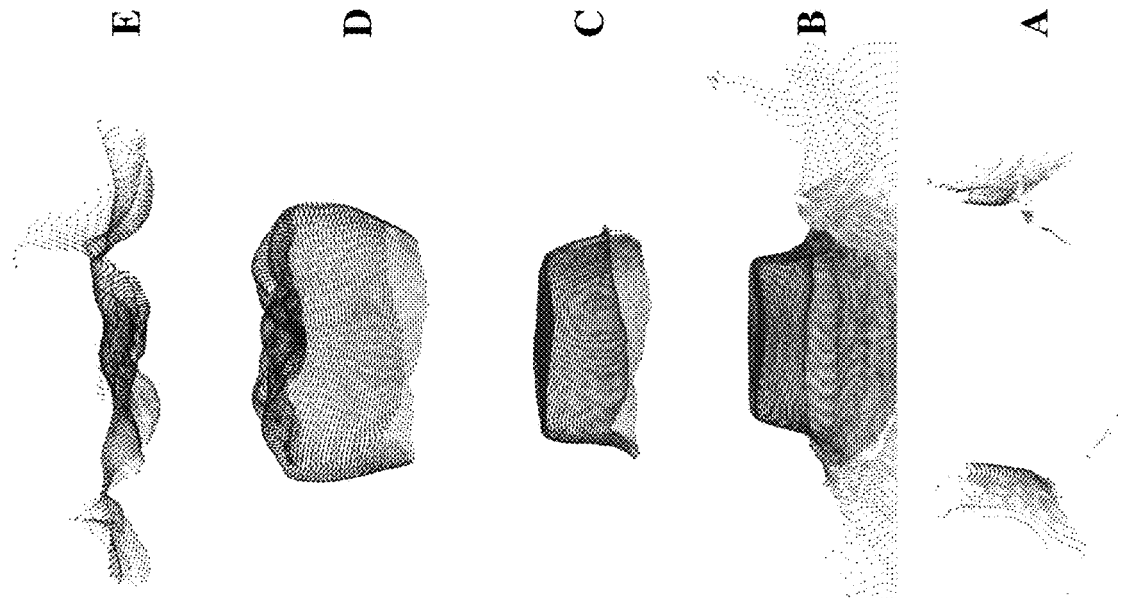

FIG. 14 illustrates a selection of tooth descriptor surfaces of an abutment and crown described in relation to a common reference locus. This figure exhibits how each segmented 3D surface feature corresponds to one 2D descriptor matrix of distances which are anchored in space by the common reference locus. By encoding each surface in a different 2D descriptor matrix each surface feature can be matched to other similar surface features in a descriptor database and related surfaces can be brought forward for use in crown and abutment design, reducing the time required to create a CAD for new abutments and crowns. In particular, once a tooth surface and surrounding surfaces from a patient is matched to a similar tooth and surrounding surface in the descriptor database, the similar tooth can bring forward linked surfaces, for example a crown and abutment design that can be used as a starting point for crown and abutment design for the patient. Each 3D surface can be reconstructed with just the data encoded in the 2D descriptor matrix and represented as a unique 2D descriptor matrix which can be searched and matched in the 2D matrix descriptor database. Each 2D descriptor matrix can also be converted into a visualization map, where, as shown: A is a mesh image of neighboring teeth to a dental object and its associated visualization map; B is a mesh image of a dental post and its associated visualization map; C is a mesh image of an internal crown surface and its associated visualization map; D is a mesh image of an external crown surface and its associated visualization map an outer crown surface; and E is a mesh image of an opposite jaw occlusal surface and its associated visualization map.

Figure 15A:
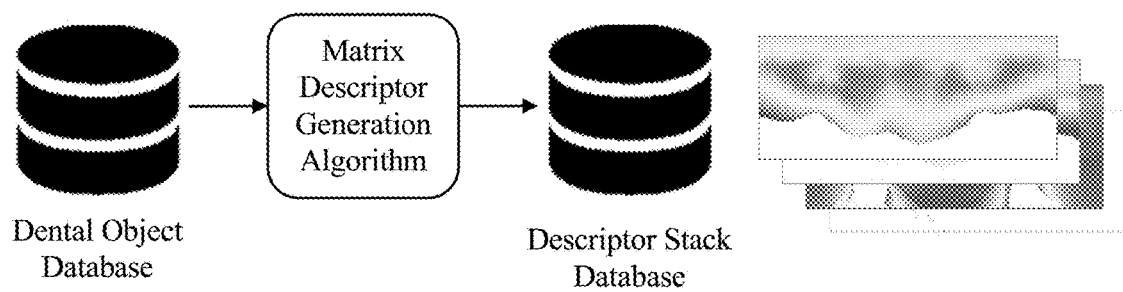
FIG. 15A illustrates a method for converting mesh images in a dental object database into two-dimensional descriptor matrixes in a dental descriptor stack database.

FIG. 15A illustrates a method for converting mesh images in a dental object database into two-dimensional descriptor matrixes in a dental descriptor stack database. Dental object databases exist which store a plurality of mesh file images of dental objects, and the entire database can be converted en masse to a descriptor stack database using the matrix descriptor generation algorithm method or dental file segmentation method as described herein to create tooth descriptor matrixes such that the dental images can be classified and matched.

Figure 15B:
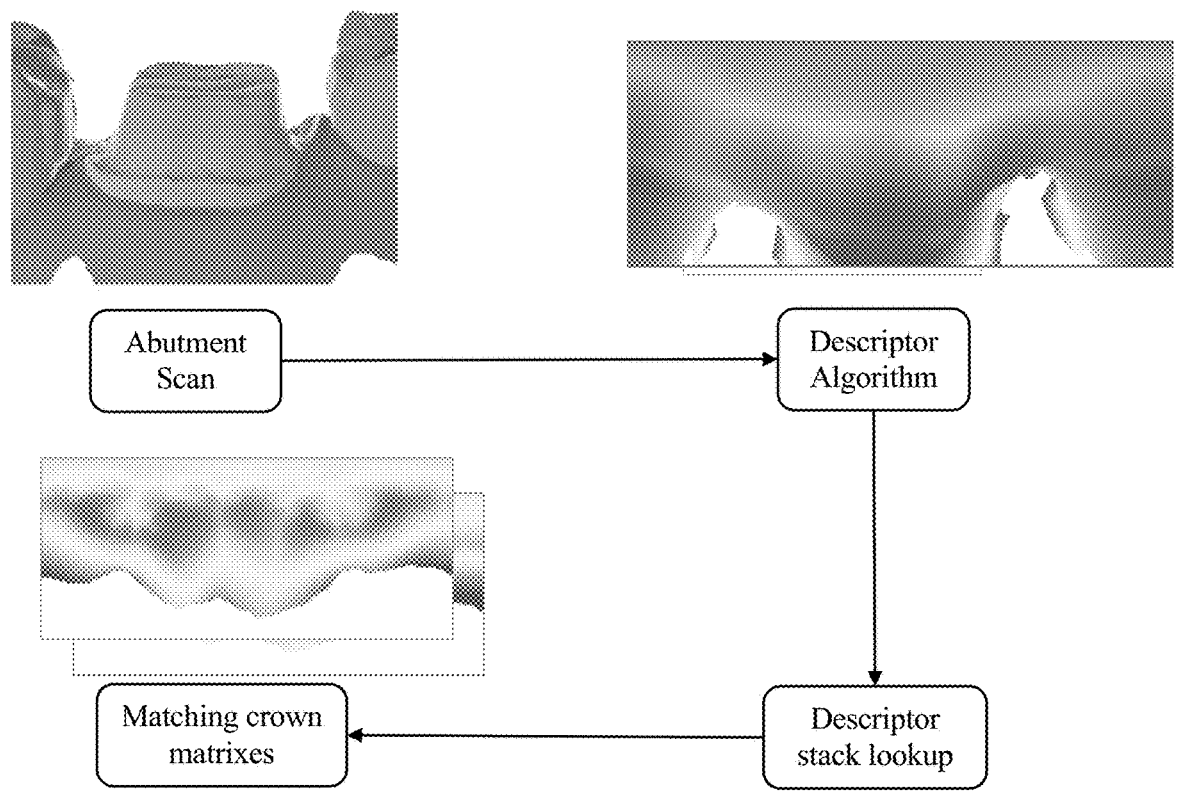
FIG. 15B illustrates a method of matching an abutment to a matching crown in a dental object database comprising dental objects represented as two-dimensional descriptor matrixes.

FIG. 15B illustrates a method of matching an abutment to a matching crown in a dental object database comprising dental objects represented as two-dimensional descriptor matrixes. In a descriptor stack database both the descriptor matrix stack and the visualization map for each descriptor matrix can be easily scanned to identify matching descriptor stacks. In this example an abutment scan of a crown post is converted into a descriptor matrix stack comprising a descriptor matrix for the outside of the crown post, gumline, and neighboring tooth environment using a descriptor algorithm. Each descriptor matrix in the complete descriptor stack can then be searched in the descriptor database in the descriptor matrix classification of that matrix and one or more matching matrixes can be brought forward as matching to a minimal degree as set by the algorithm. In the example shown the matching crown matrixes are brought forward as matching the abutment scan, however concurrent matching gumline matrixes and matching neighbor tooth matrixes can simultaneously be brought forward based on the original descriptor stack. In crown design, design of the gumline abutment of the crown can be automated based on matching descriptor matrixes of the gumline, and simultaneously design of the exterior surface of the crown can be automated by using the matching descriptor matrixes to the neighbor teeth stack to obtain the fit of the crown adjacent to neighboring teeth. By using the various 2D descriptor matrixes each describing a different aspect of the crown and crown environment the crown design can be automated.

Figure 16:
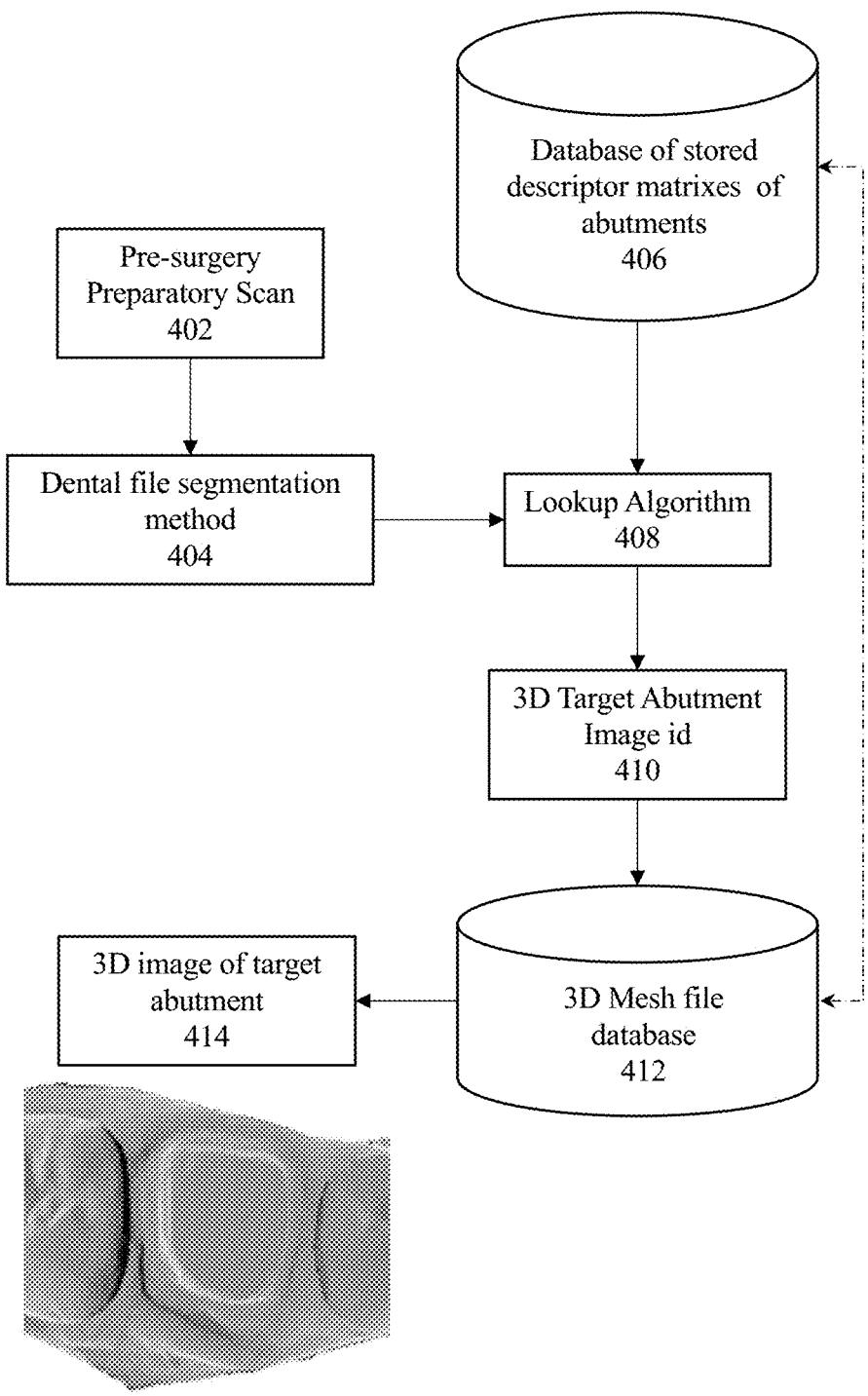
FIG. 16. is a flowchart illustrating the selection of a target abutment from a pre-surgical scan of a tooth to be shaped.

FIG. 16. is a flowchart illustrating one method of selection of a target abutment from a pre-surgical scan of a tooth to be shaped. In preparation for surgical shaping of a tooth into an abutment a dentist or dental technician scans the tooth and surfaces around the tooth in a pre-surgical preparatory scan 402 of the patient's mouth and teeth. The images received by the one or more cameras can be converted into a mesh file format using a dental file segmentation method 404 as herein described. A database of stored descriptor matrixes of abutments is 406 accessed, where the abutments are represented as 2D descriptor matrix representations created using a descriptor generation dental file segmentation method. Using these previously stored images and data files of a plurality of abutments from a database, a lookup algorithm 408 can be used to find or match the desired 3D representation of a target abutment image that will match the scanned tooth by comparing the 2D descriptor matrix of the scanned tooth to 2D descriptor matrixes of teeth in the descriptor database, where similar teeth in the descriptor database are linked to suitable abutments that have already been designed for these teeth. The abutments that are linked to the matched teeth are then considered to be suitable target abutments for the pre-surgical tooth from which an abutment needs to be created. Once a suitable target abutment is identified for the tooth using a descriptor matching method, the 3D image of the target abutment is identified by Image id 410. 3D Mesh file database 412 which contains the 3D mesh files from which the 2D descriptor matrixes are created is then accessed to provide the 3D mesh file which matches the identified image id 410. Based on the identified image id the associated 3D mesh file can be retrieved from database 412 and the 3D image of the target abutment 414 can be retrieved and displayed on a dental display on a graphical user interface.

Figure 17:
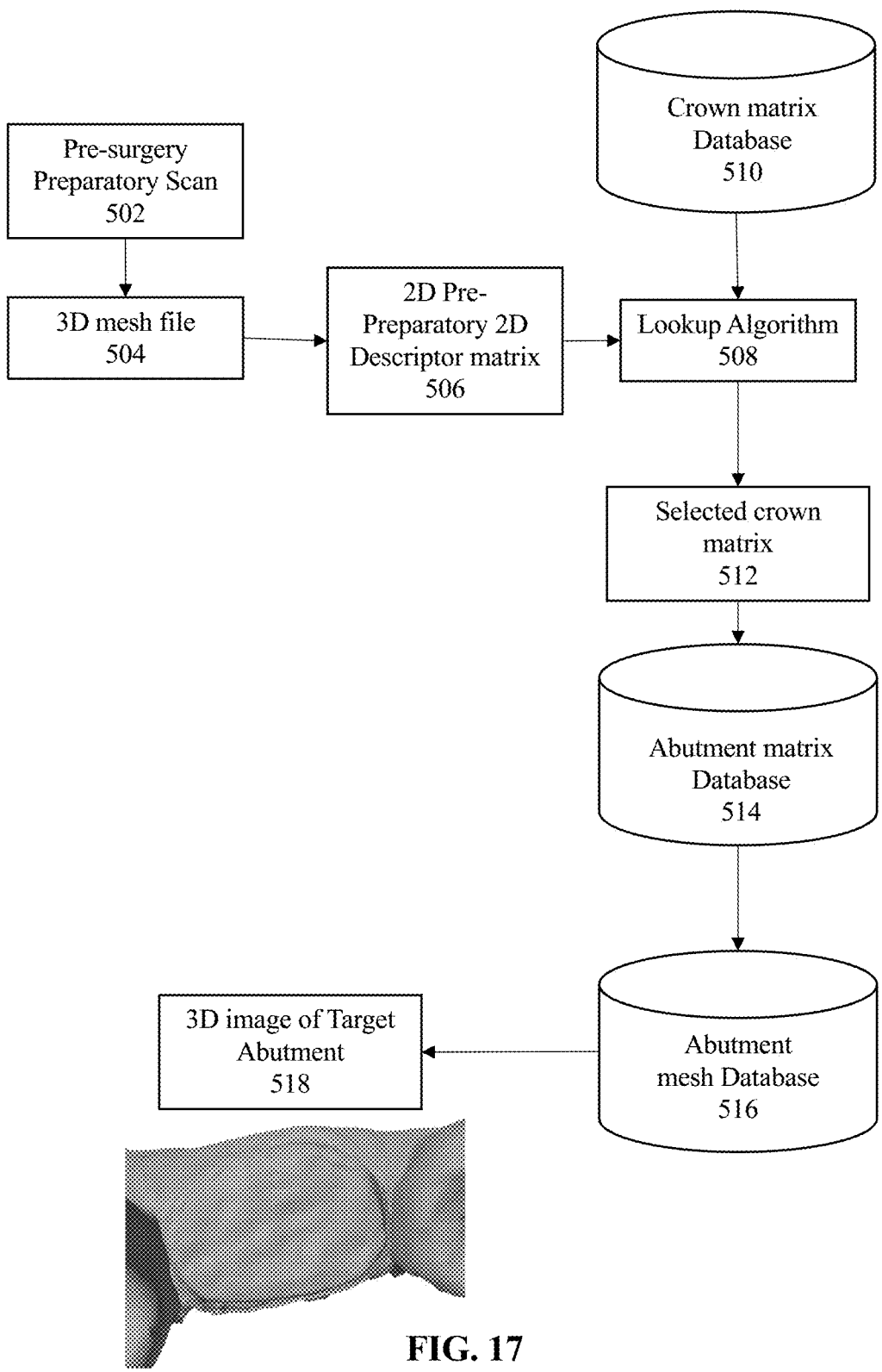
FIG. 17 is a flowchart illustrating the selection of a matching crown and abutment for a scanned tooth.

FIG. 17 is a flowchart illustrating the selection of a matching crown and abutment for a scanned tooth. Matching the tooth to be shaped with a matching tooth linked to a pre-designed crown in the tooth descriptor database can be done by comparing the 2D matrix descriptor representation of the tooth to be shaped to find similar matrixes. In the database, each tooth that has been scanned has linked or integral 2D descriptor matrixes for other related surfaces in and around the tooth, for example the abutment that was used to receive the crown, the crown design including the interior crown surface which fits the abutment and the exterior crown design which is designed to accommodate surfaces in and around the tooth, for example the gum surfaces, adjacent tooth surfaces, and opposing occlusal surfaces. Since the crown design and overall thickness from the interior crown surface to the exterior crown surface is also dependent on the material used to manufacture the crown, these can also be taken into consideration when the tooth descriptor database is searched to find matching tooth preparations. Additionally, changes to the recommended abutment design can also be modified from existing matching designs, such as by increasing the amount of material to be removed from the tooth to adjust for a crown material that requires greater crown thickness.

At the start of the surgery a pre-surgery preparatory scan 502 is obtained of the tooth in its environment, which is converted from the acquired image file format into a 3D mesh file 504. The 3D mesh file is then converted into 2D descriptor matrix file 506 using a dental file segmentation method as herein described. The 2D pre-preparatory descriptor matrix 506 is then subjected to a lookup algorithm 508, which matches the pre-preparatory descriptor matrix 506 to a tooth and/or crown in the crown matrix database 510 by comparing 2D descriptor matrixes of the tooth to be shaped with teeth and crowns in the crown matrix database 510. To enable comparison and matching of 2D descriptor matrixes of different but similar teeth and crowns, a dental file segmentation method is used with a common centroid chosen and aligned along the z-axis of each tooth. Assigning and aligning the z-axis of each tooth or crown to a central axis and using the same dental file segmentation algorithm along the same z-axis with the same common centroid for all descriptor matrixes enables matching with other crown and tooth descriptor matrixes with the same reference loci. In particular, it is noted that when the z-axis alignment and dental file segmentation algorithm are consistently used for all teeth and crowns in the database, individual cells in each 2D descriptor matrix are the measure of distance from the indexing centroid to the tooth or crown surface along the same indexing ray. Comparison and matching of distances between 2D descriptor matrixes is thereby simplified, enabling rapid matching of like descriptor matrixes, and therefore like 3D dental structures.

Using this method, lookup algorithm 508 will find the selected crown matrix 512 from the crown matrix database 510. Each crown in the crown matrix database 510 is also linked to an abutment in an abutment matrix database 514, where the interior surface of a crown in the crown matrix database 510 matches and is capable of mating with its matching abutment as stored in the abutment matrix database 514. Each abutment in the abutment matrix database 514 is also linked to its associated 3D mesh file in an abutment mesh database 516, for which the 2D descriptor matrix in the abutment matrix database 514 is a 2D representation. Once the matching 3D mesh file is retrieved from the abutment mesh database 516 the 3D image of the target abutment 518 can be displayed on the dentist display.

Figure 18:
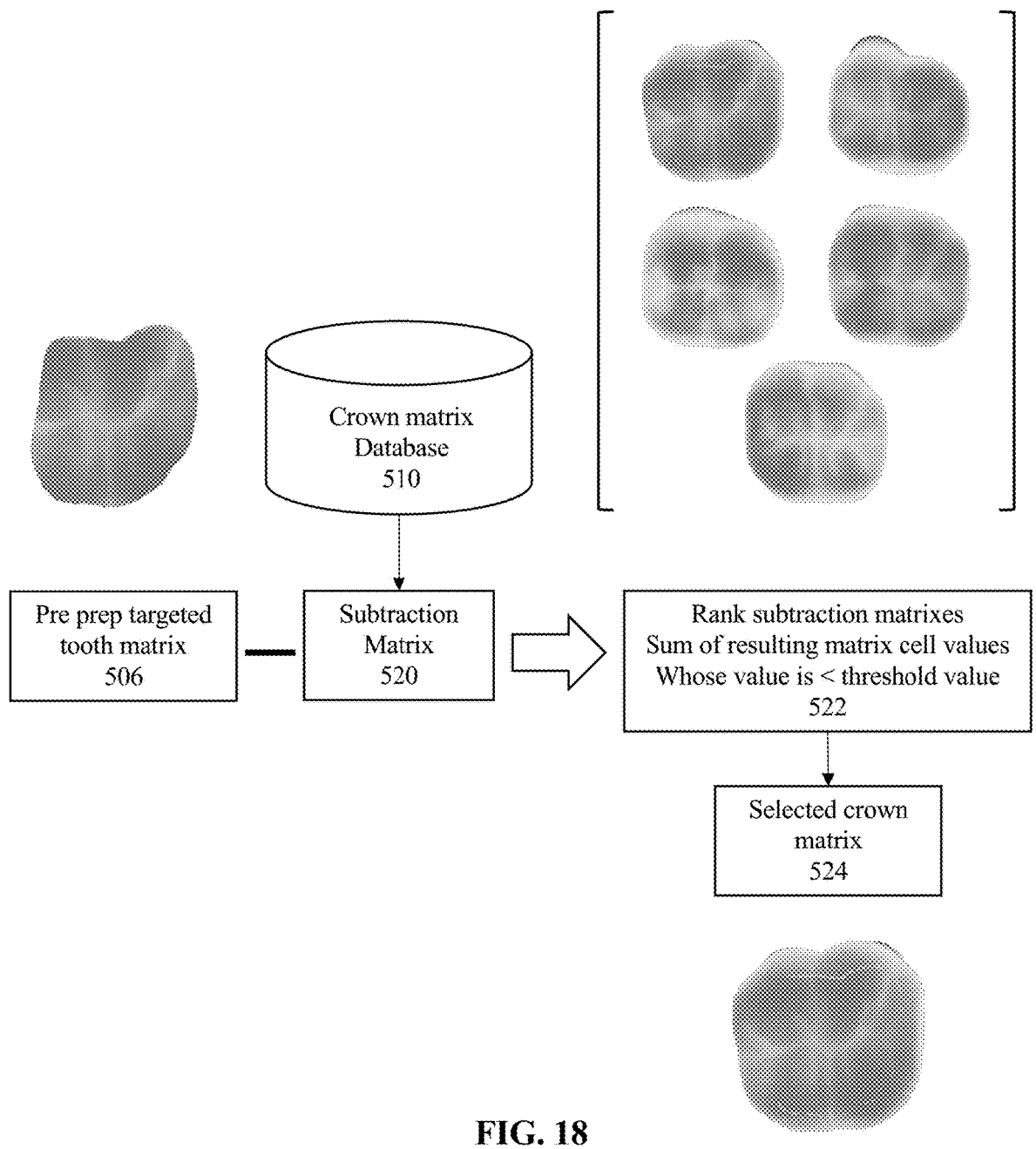
FIG. 18 illustrates a lookup algorithm for the matching of the pre-preparation tooth to a matching crown matrix in a descriptor database.

FIG. 18 illustrates a lookup algorithm for the matching of the pre-preparation tooth to a matching crown matrix in a descriptor database. As mentioned above the algorithm receives two inputs, one pre-preparatory targeted tooth descriptor matrix 506 and a second crown matrix database 510 where there are many thousands of crown descriptor matrixes. The lookup algorithm can compare the 2D descriptor matrixes in the crown matrix database 510 to pre-preparatory targeted tooth descriptor matrix 506 using a subtraction matrix 520. As both matrices are obtained using a common centroid methodology and dental file segmentation algorithm they are comparable cell by cell, and subtraction is achieved by subtracting values present in the cells of the same location in the matrix. Using this method a subtraction matrix is obtained for each crown matrix present in the database. One can use fewer number of matrixes for comparison by just matching only crown matrixes whose tooth number is matching with the targeted tooth's tooth number. Alternatively, crowns in the crown matrix database can be grouped, and only representative matrixes of each group can be compared to reduce processing time. Alternatively, any other logic can be used to reduce the number of comparisons to reduce the processing time. Once the subtraction matrixes are obtained, the subtraction matrixes are assigned a number which is the sum of all the values present in the matrix and ranked 522. The total sum for any given matrix subtraction is indicative of how closely matching the crown matrix is in alignment or similarity to the targeted tooth matrix. In one embodiment, to rank the subtraction matrixes the sum of the resulting matrix cell values is obtained, and the matrixes are ranked by sum. Matrixes whose value is less than the set threshold value are considered to be close matches for the purpose of shape matching the tooth matrix to a suitable crown matrix. A matching crown matrix can then be selected as a match 524.

Figure 19:
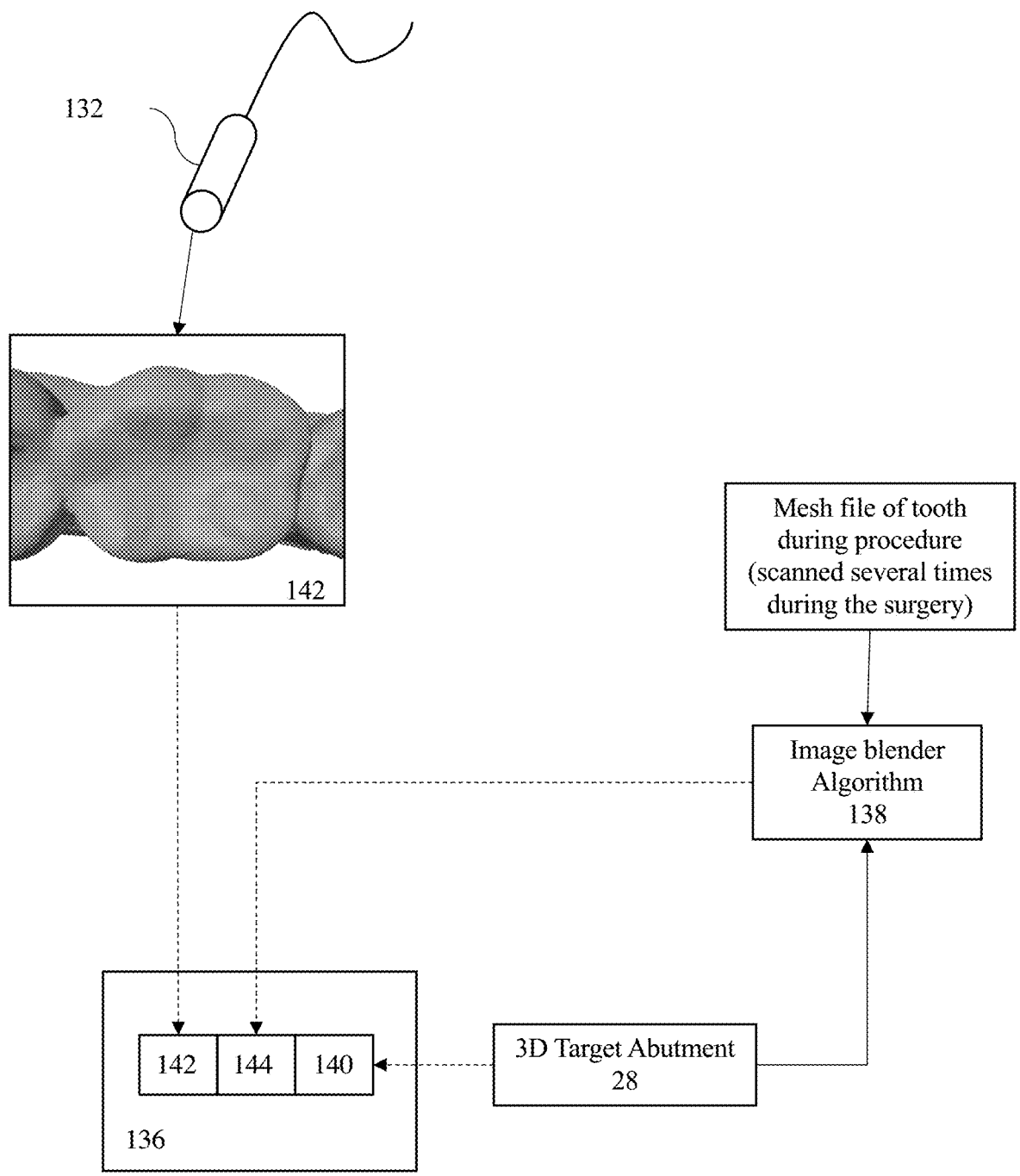
FIG. 19 is a flowchart illustrating the guided surgery or scraping of the abutment to match the crown.

FIG. 19 is a flowchart illustrating the guiding surgical scraping and shaping of an abutment to match the selected crown and abutment. Once a matching suitable crown 2D descriptor matrix has been selected, the matching crown matrix can be used to find a corresponding abutment matrix from the abutment matrix descriptor database as described above. The common centroid methodology gives the stack of 2D descriptor matrixes a common reference point such that the matrixes can easily be stacked and compared. Further, related descriptor matrixes, for example those pertaining to the same patient and location comprising a plurality of related surfaces, can be linked for easy retrieval. For example, for a single tooth location in a patient, 2D descriptor matrixes for the gumline, abutment, crown interior surface, crown exterior surface, adjacent teeth, and occlusal tooth surfaces can all be linked in the database. Accordingly a corresponding abutment matrix file can be easily found, and once found, the 2D descriptor matrix file points to its corresponding 3D mesh file from abutment mesh database which can be displayed as the 3D target abutment. Background features can also be minimized or removed from the abutment environment, for example extraneous information such as the full surrounding teeth and opposite occlusal surfaces.

In addition, the 3D image of the tooth for shaping 142 can include anchor features for assisting the dentist with orientation in the mouth, such as the gumline and closest adjacent tooth surfaces. During the procedure, dental scanner 132 is used to first image the tooth preparatory site to provide the initial 3D image of the tooth for shaping 142, and then successive images are taken with the dental scanner 132 throughout the procedure to update the images of the tooth undergoing shaping compared to the target abutment on the dentist display 136. The 3D image of the target abutment 140, 3D image of the tooth 142 undergoing the shaping procedure, and the blended image 144 overlay can be enlarged, as well as manipulated in 3D on the dentist display 136 to provide a full 3D view of the tooth undergoing shaping. A 3D image for the 3D target abutment 140 is shown, in one embodiment, on the right side of the dentist display 136. As the 3D datafile for the target abutment 28 is a 3D mesh file, the view on the dentist display 136 can be selected and the position manipulated using input to the dentist display in such a way that a clear abutment view can be viewed from the top, sides, and include all margin lines, gum line and other related anatomy features such that these are visible to the dentist during the procedure with rotation and movement of the 3D images on the dentist display 136.

It is noted that 3D target abutment 28 selected from the database contains linked 3D data also regarding other related surfaces, for example gum areas and adjacent teeth, which can be optionally displayed. In one embodiment, the 3D mesh image for the 3D target abutment 140 shows the abutment area, the margin line, and the base or shoulder where the crown will sit, as this is the most critical information to build the abutment. Additional 3D images of the tooth for shaping 142 can be obtained throughout the procedure to provide mid-procedure guidance on the abutment shaping and are overlapped through an image blender 138 algorithm to provide a blended image 144. Once scraping is complete the dentist can check the accuracy of the created abutment against the target abutment by applying the image blender 138 and observing the overlay of the 3D image of target abutment 140 and the 3D image of tooth for shaping 142 on the dentist display to ensure a close match to the target abutment. The software can also alert the dentist to rough edges, surface roughness, or overhangs on the abutment that would interfere with proper fit of a crown such that these can be adjusted by shaving before the procedure is completed. On the graphical user interface a display of the final abutment tooth image can be overlayed with the target abutment image, with one of the images having transparency to show the difference between the tooth and the abutment to guide the dentist to shape the tooth into the shape of the abutment to receive a crown. The final 3D image of tooth for shaping 142 in its final abutment shape can also be used as the exact model for creating a crown that perfectly matches the created abutment.

Figure 20:
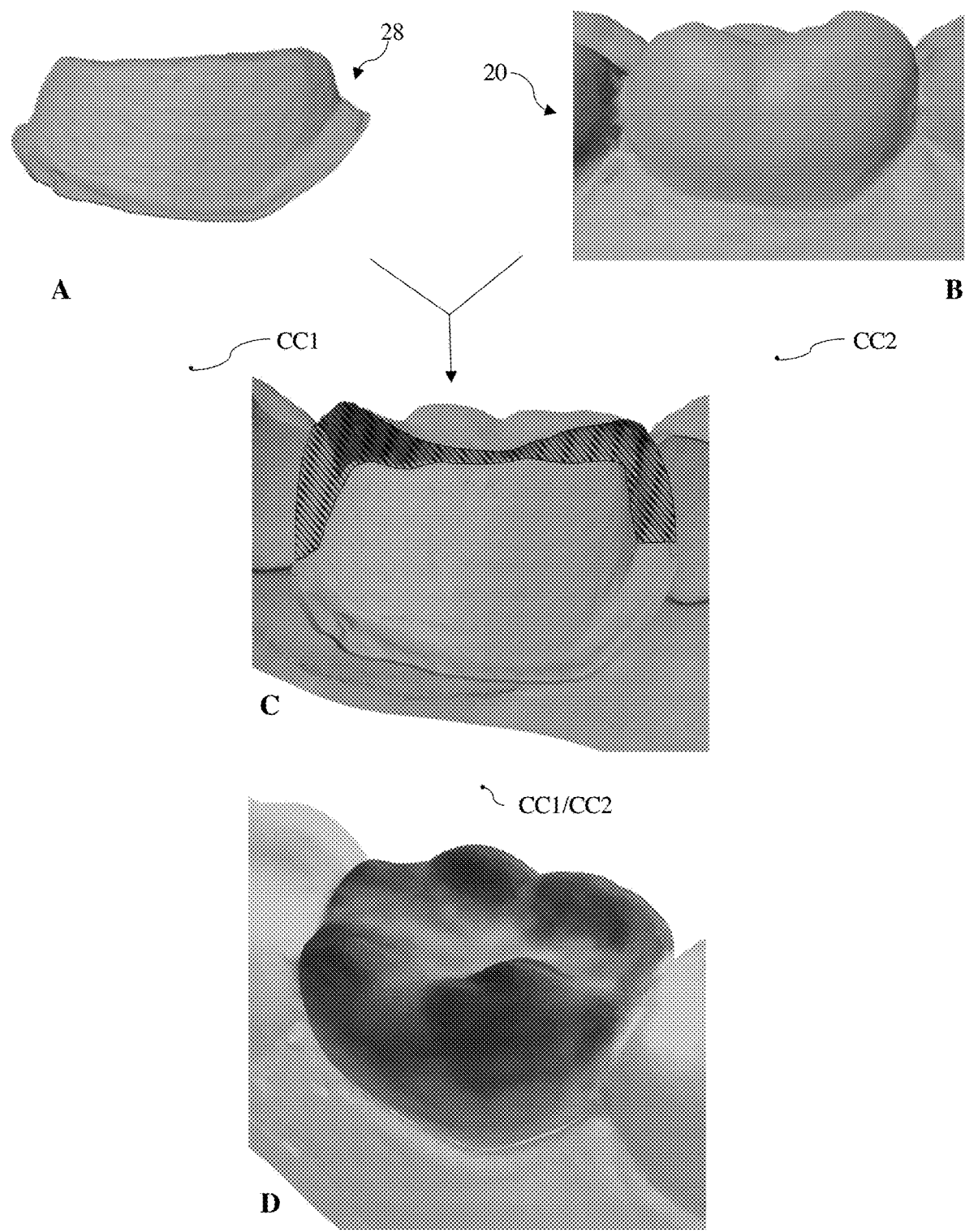
FIG. 20 is a set of images illustrating a guided abutment shading algorithm based on an aligned target abutment and tooth undergoing surgical preparation.

FIG. 20 is a set of images illustrating a guided abutment shading algorithm based on an aligned target abutment and tooth undergoing surgical preparation using an image blender. As shown, a common centroid CC1 is assigned for the target abutment 28 shown as image A and a common centroid for CC2 is assigned for the tooth for shaping 20 shown as image B, where both common centroids are assigned relative to the tooth and abutment using the same dental file segmentation algorithm. The common centroids CC1 and CC2 can thereby be aligned so that the mesh files for the target abutment 28 and the tooth for shaping 20 will merge into one overlay image. Indexing rays can then be cast from common centroids CC1 and CC2, and a 2D descriptor matrix for each of the target abutment 28 and the tooth for shaping 20 can be generated. Using the 2D descriptor matrix representation for each of the target abutment 28 and the tooth for shaping 20, the difference in the radial distance between the now common centroids CC1/CC2 to each of the surface features can be calculated using cell differences in each of the aligned 2D descriptor matrices as shown in image C. As shown in image D, threshold colors or shading can be assigned based on the difference in radial distance to indicate to the dentist where on the tooth more material needs to be removed to match the target abutment. In the example shown, dark areas represent the greatest difference and indicate locations where material needs to be removed, and light areas indicate less or no difference in radial distance and a suitable surface at that location.

Figure 21:
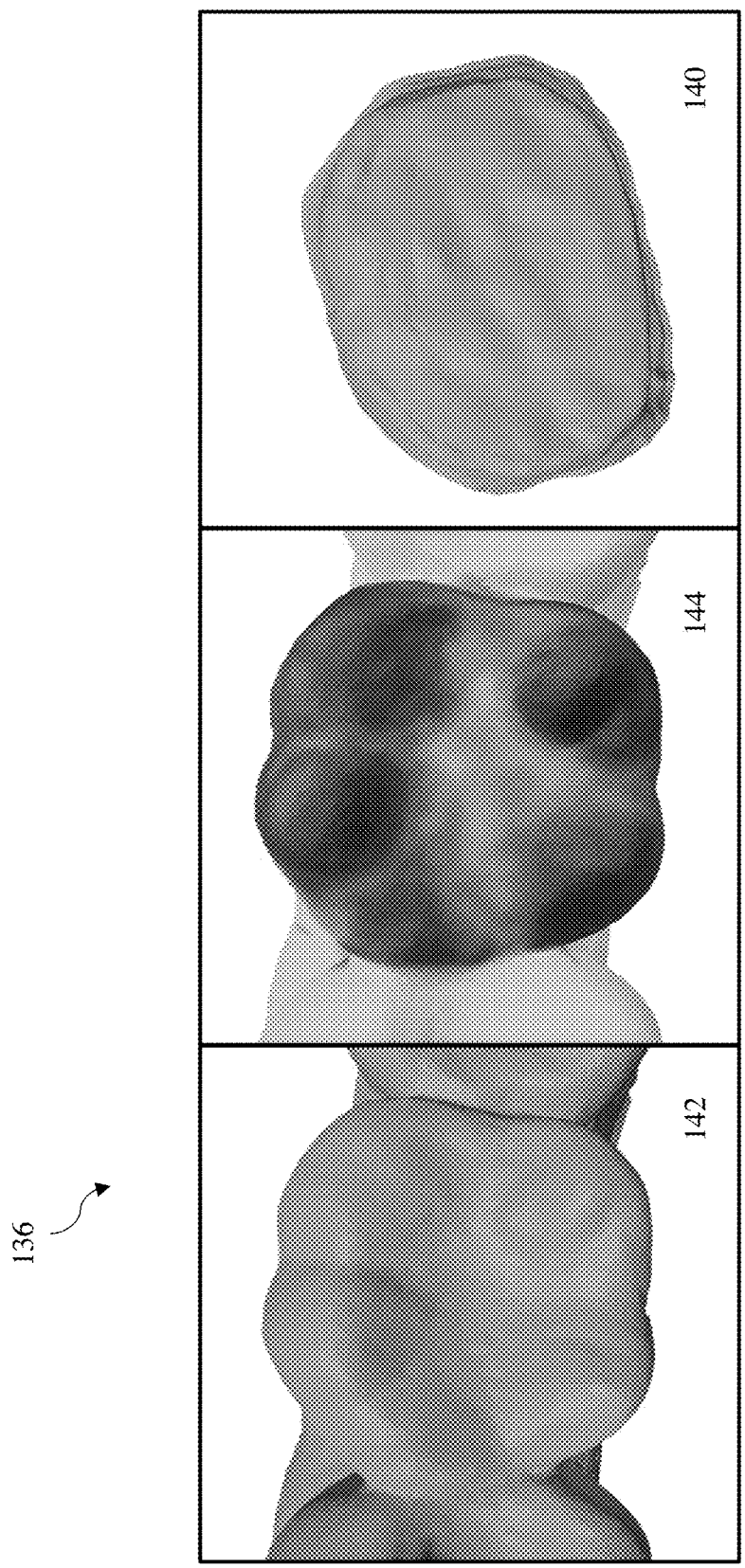
FIG. 21 shows an example dentist display on a graphical user interface showing the target abutment overlayed with the tooth during a guided abutment preparation procedure.

FIG. 21 shows an example dentist display 136 showing the target abutment overlayed with the tooth during the guided abutment preparation procedure. An output image of the dental scanner is shown as 3D image of tooth for shaping 142. This image can be taken at the start of the tooth shaping procedure and updated every time an updated scan of the tooth is obtained. The 3D image of the target abutment 140 is shown to illustrate how the prep-site will look like once the procedure is completed. In the middle is the output of an image blender algorithm which displays the blended image 144 of the target abutment and tooth for shaping. As the system runs in cycle and updated dental scans of the tooth are obtained during the procedure the dentist display and images thereon can be updated. As described, differently shaded or colored areas indicate to the dentist where to scrape and how much to scrape based on the shade and/or color difference on the target tooth. During the procedure updated scanning of the prep-site again and uploading of the new scan will update the blended image. The distance between the actual tooth or tooth for shaping 142 will be reduced as the preparative surgery progress, and the colour or shading on the dentist display is adjusted to visually show the amount of tooth remaining to be removed. In the blended image 144 shown, the distance between the tooth for shaping 142 and the target abutment 140 is darker in areas where more tooth needs to be removed, and lighter where less or no tooth needs to be removed meaning the tooth is means closer in shape to the target abutment 140 in that location. If distances to target are displayed numerically, in one example a color or shading scale adjacent the blended image 144 can be provided to illustrate how much tooth remains to be removed in microns to achieve the target abutment 140. Dental file segmentation and conversion of the dental files into 2D descriptor matrixes enables the dentist display to be updated rapidly during the procedure such that real-time guidance can be provided.

Figure 22:
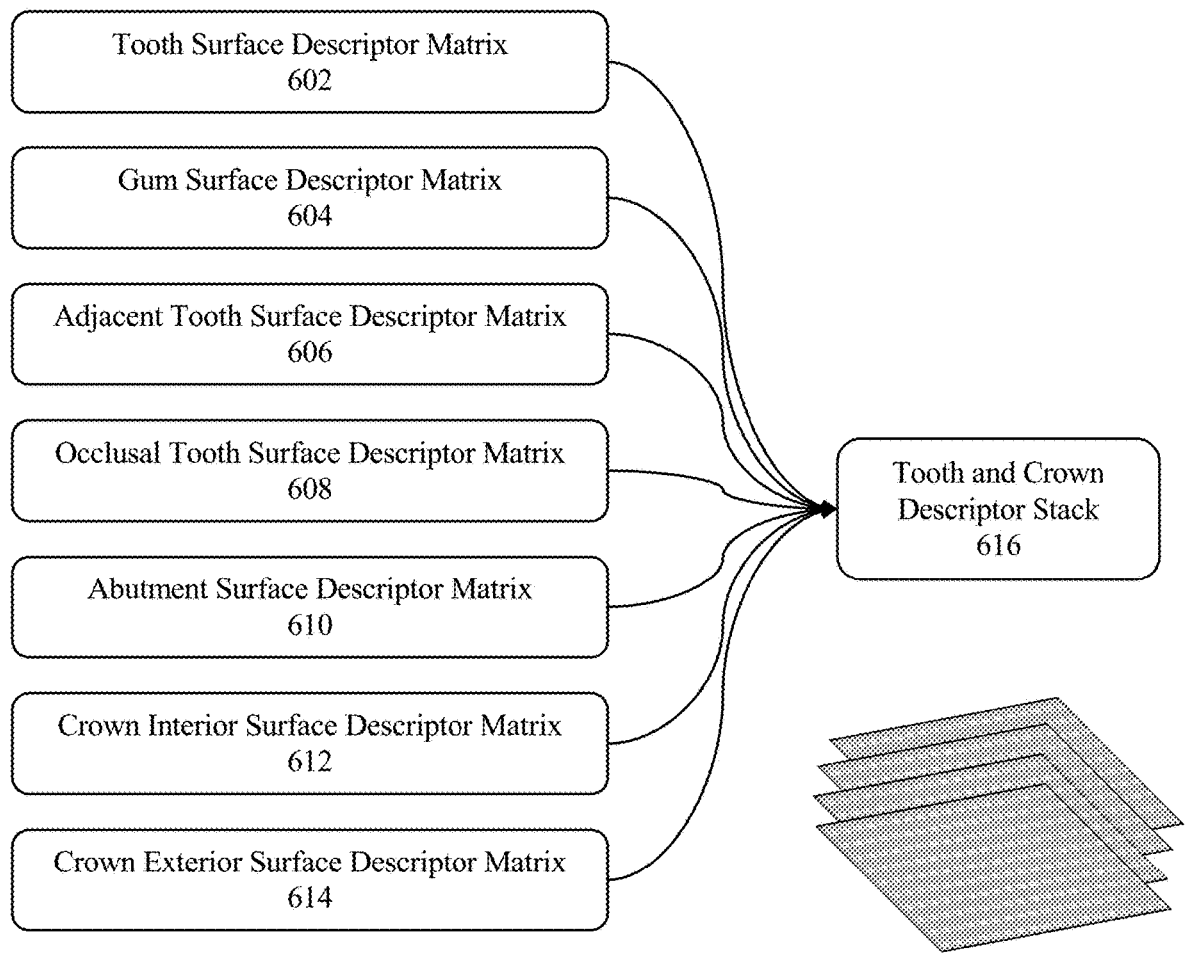
FIG. 22 illustrates how 2D descriptor matrixes of different surfaces in and around a tooth are linked in a descriptor stack.

FIG. 22 illustrates how 2D descriptor matrixes of different surfaces in and around a tooth are linked such that a tooth descriptor input can be input to the present method and a suitable abutment can be output. As shown, a single Tooth and Crown Descriptor Stack 616 for a single tooth can comprise a plurality of 2D descriptor matrixes, where each descriptor matrix describes a different surface around the tooth. The anchoring of all of the descriptor matrixes at a single reference locus or centroid and use of the same dental file segmentation method for every surface ensures that each cell in every 2D matrix in the stack is mapped to the same indexing ray extending from the centroid and enables the stack of 2D descriptor matrixes to be anchored in space. One example Tooth and Crown Descriptor Stack 616 comprises the following set of 2D descriptor matrixes: Tooth Surface Descriptor Matrix 602; Gum Surface Descriptor Matrix 604; Adjacent Tooth Surface Descriptor Matrix 606; Occlusal Tooth Surface Descriptor Matrix 608; Abutment Surface Descriptor Matrix 610; Crown Interior Surface Descriptor Matrix 612; and Crown Exterior Surface Descriptor Matrix 614.

Figure 23:
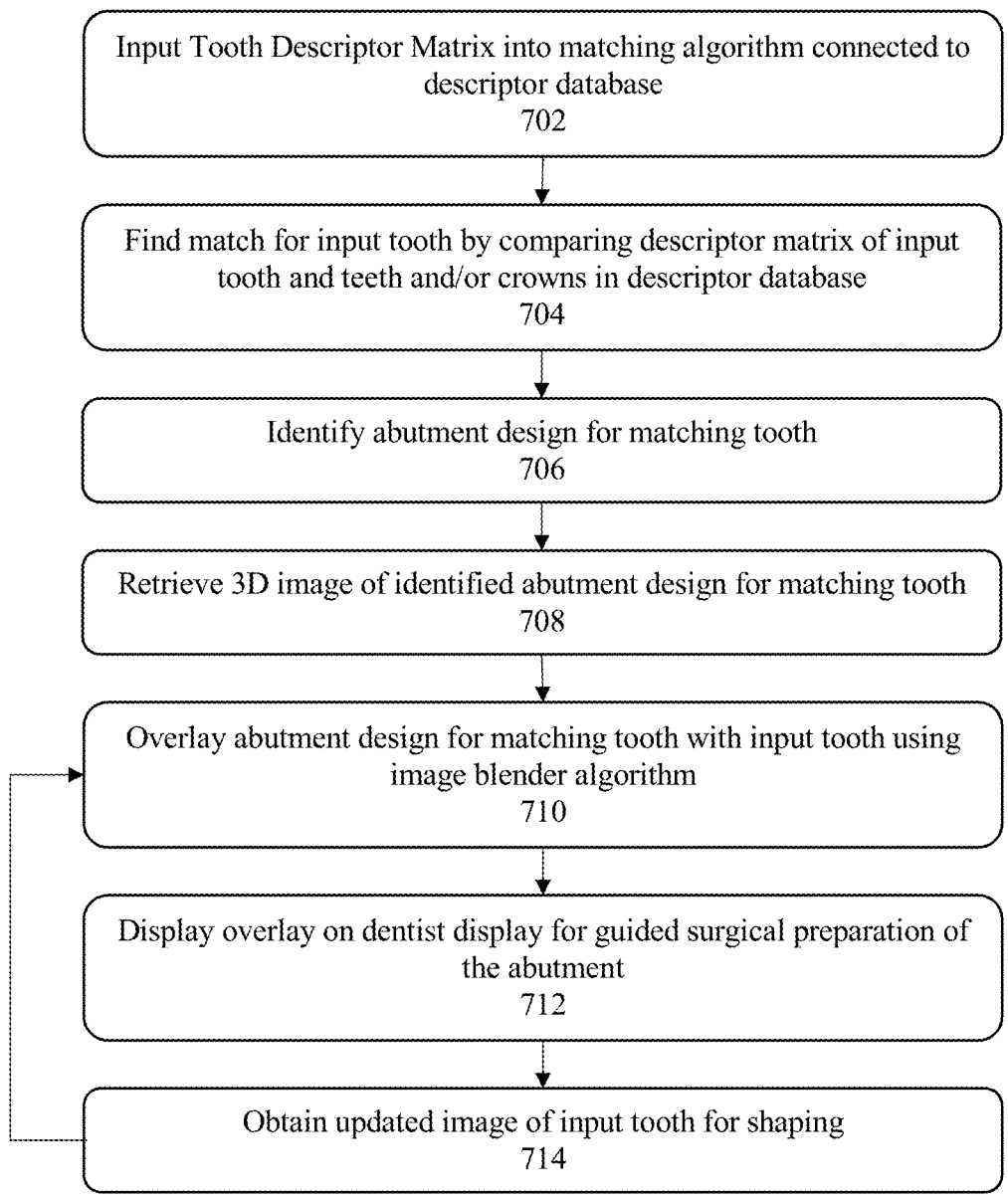
FIG. 23 is a flowchart of a method of guided surgical preparation of an abutment.

FIG. 23 is a flowchart of an example method of guided surgical preparation of an abutment. First the system receives an Input Tooth Descriptor Matrix into a matching algorithm connected to a descriptor database 702. A match is then found for the input tooth by comparing the descriptor matrix of the input tooth and teeth and/or crowns in descriptor database 704. An abutment design is then identified for the matching tooth 706 by bringing forward the abutment that is linked to the matched crown design in the descriptor database. The 3D image of the identified abutment design for matching tooth is then retrieved 708, and an overlay of the abutment design for the matching tooth with the input tooth is created using an image blender algorithm 710. The overlay is then displayed on a dentist display for guided surgical preparation of the abutment 712. Updating of the dentist display can be done during and after the procedure to further guide shaping of the abutment by obtaining an updated 3D image of the tooth for shaping 714 and re-creating the overlay and displaying the same on the dentist display. The procedure is complete once the created abutment sufficiently matches the target abutment.

The present method and system provides a bedside Computer Aided Design application to assist dentists with designing a suitable abutment using a computer and artificial intelligence matching technology. This technology brings this concept to a new level by guiding the hand of a dentist in real time during the preparative surgery for creating an abutment for receiving a crown or dental prosthetic. As described, guidance during the procedure can be done displaying simultaneously successive images of tooth being shaped in the procedure, showing the progress of the tooth while it is being cut and shaped, the abutment shape during the procedure, as well as provide accurate measurements of the amount of material being shaped and cut. The dentist can thereby follow the 3D template clearly displayed on a screen next to the patient to have guidance provided by CAD to accurately shape an abutment.

Figure 24:
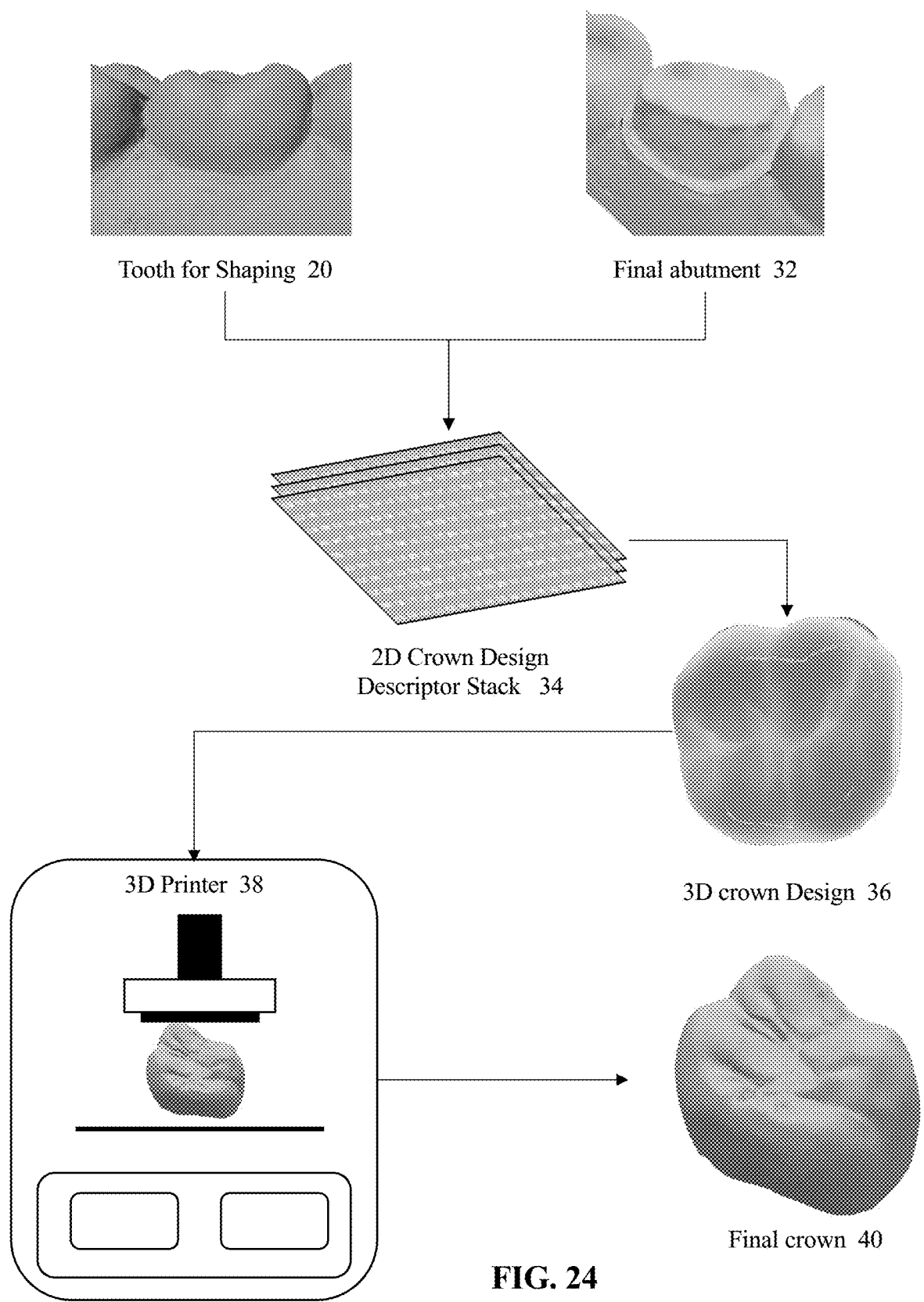
FIG. 24 is a flowchart illustrating conversion of tooth and surgical descriptor files into a printed 3D dental crown.

FIG. 24 is a flowchart illustrating a method of conversion of tooth and surgical descriptor files into a printed 3D dental crown. A 3D image of the tooth for shaping 20 before the dental procedure can be converted into a 2D matrix descriptor file as a guideline for the 3D shape of final crown design. Once the final abutment 32 has been crafted by the dentist now the design of the final crown can be done taking into account the 3D shape of the final abutment 32. To accomplish this, the 3D image of the final abutment 32 created during the surgical shaping procedure is converted into a 2D matrix descriptor file to provide a 2D representation of the 3D shape of the inside of the required crown. In this way the inside of the final crown 40 will provide a good fit to the actual surgically shaped final abutment 32 because it is designed based on the actual final abutment 32 inside the patient's mouth. The combination of the 2D matrix descriptor files for the tooth for shaping 20 and the final abutment 32 provides a 2D crown design descriptor stack 34, describing the interior of the crown from the final abutment 32 as well as the exterior of the crown from the initial shape of the tooth before the abutment was created. The 2D crown design descriptor stack 34 can then be converted back into a 3D crown design 36 that can be sent as a data file to a 3D printer 38 to be printed on site. The design and manufacture of 3D printed crowns at the dentist site, reducing the number of dental visits and speeding up the process of the dental procedure. Based on the tooth to be prep we can obtain different descriptors like margin line, Crown Exterior Surface, Occlusal Tooth Surface Descriptor etc. and from final abutment we can obtain Abutment Surface Descriptor and Crown interior surface Descriptor matrix information and based on all these matrixes we can obtain the final crown descriptor matrix which is combination of those different matrixes. Once 2D crown descriptor is obtained it can be converted into 3D crown STL file for 3D Printing. The 3D STL crown file is used by the 3D Printer, a selected resin is used, and the final 3D crown 40 is created. As the final crown 40 is designed based on the 3D images received of the tooth and abutment, with accurate 3D printing the crown should be a good fit for the actual abutment.

As can be understood, the examples described above and illustrated are intended to be exemplary only. All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. Such variations are not to be regarded as a departure from the scope of the invention, and all such modifications as would be obvious to one skilled in the art are intended to be included within the scope of the following claims.

What is claimed is:

1. A method of guiding tooth abutment shaping comprising:
   scanning a tooth with a scanner to obtain a three dimensional (3D) image of the tooth; converting the 3D image of the tooth into a 3D mesh file of the tooth;
   converting the 3D mesh file of the tooth into a two dimensional (2D) descriptor matrix representation of the tooth by assigning an indexing centroid to the 3D mesh file, measuring a length of each of a plurality of indexing rays, each indexing ray extending from the indexing centroid to a surface of the tooth, and storing the length for each of the plurality of indexing rays in a 2D matrix to create a 2D descriptor matrix of the 3D mesh file;
   selecting a target abutment for the tooth from a descriptor database, the abutment linked to a tooth shape in the descriptor database that matches the tooth; and
   on a graphical user interface, displaying an overlay image of the tooth with an image of the selected target abutment to guide shaping of the tooth into an abutment.

2. The method of claim 1, wherein the image of the tooth to be shaped and the image of the selected abutment displayed on the graphical user interface are 3D images.

3. The method of claim 1, wherein the image of the tooth and the image of the selected abutment displayed on the graphical user interface can be rotated in space on the graphical user interface.

4. The method of claim 1, wherein the 2D descriptor matrix representation of the tooth and the 2D descriptor matrix representation of the selected abutment are aligned by a common centroid.

5. The method of claim 1, wherein in the overlay image, at least one of the image of the tooth and the image of the selected abutment is displayed with transparency.

6. The method of claim 1, wherein the overlay image is colored to illustrate a difference between the tooth to be shaped and the target abutment.

7. The method of claim 1, wherein selecting a target abutment comprises:
   matching the tooth with at least one matched tooth from a descriptor database of 2D matrixes representations of teeth; and
   retrieving an abutment from the database that is linked to the at least one matched tooth.

8. The method of claim 7, wherein matching the tooth with at least one matched tooth from the descriptor database comprises comparing the 2D descriptor matrix representation of the tooth with a plurality of 2D descriptor matrixes in the descriptor database and selecting at least one matching tooth based on a set threshold based on a subtraction algorithm.

9. The method of claim 1, wherein the 2D descriptor matrix representation of the tooth and tooth shapes in the descriptor database are created using a dental file segmentation method using a common centroid.

10. The method of claim 1, further comprising re-scanning the tooth to be shaped to obtain an updated scan, converting the updated scan into an updated 2D descriptor matrix representation of the tooth, and updating the image of the tooth and the overlay image in the graphical user interface.

11. The method of claim 1, further comprising measuring a distance between the target abutment and the tooth and indicating in the graphical user interface an amount and location of tooth shaping required by coloring the overlay image according to the measured distance.

12. The method of claim 1, wherein the overlay image is created using an image blender algorithm.

13. The method of claim 1, further comprising selecting the target abutment based on similarity of the 2D descriptor matrix representation of the tooth to descriptor matrixes in the descriptor database matching one or more of gum surface, abutment surface, tooth surface, opposite occlusal surface, crown shape, crown material, tooth shape, tooth location, abutment margin line, gum line, and crown method of manufacture.

14. A system for guiding tooth abutment shaping comprising:
- a dental scanner for scanning a tooth;
- a descriptor generating system for receiving a 3D mesh file of the scanned tooth from the dental scanner and creating a 2D descriptor matrix of the tooth comprising:
  - an indexed slicer for slicing the mesh file into a plurality of slices, each slice comprising a cross-sectional boundary of the dental object;
  - a radial encoder assigning an indexing centroid and measuring a plurality of rays from the indexing centroid to the cross-sectional boundary; and
  - a Fourier neural operator unit to transform the plurality of ray lengths into a 2D descriptor matrix of the tooth;
- a descriptor database comprising a plurality of 2D descriptor matrixes for a plurality of teeth;
- a lookup algorithm to compare the 2D descriptor matrix of the scanned tooth to 2D descriptor matrixes of teeth in the descriptor database to select a similar tooth based on the similarity of the 2D descriptor matrix of the scanned tooth and a 2D descriptor matrix of the similar tooth and identify a target abutment linked to the similar tooth;
- an image blender for creating an overlay 3D image of the tooth and a 3D image of the target abutment; and
- a graphical user interface for displaying the overlay 3D image.

15. The system of claim 14, wherein the 3D image of the tooth and a 3D image of the target abutment are encoded by 3D mesh files.

16. The system of claim 14, wherein the descriptor database comprises a plurality of descriptor stacks, each descriptor stack comprising a plurality of descriptor matrixes linked to the same tooth.

17. The system of claim 14, wherein the plurality of descriptor stacks comprise one or more tooth surface descriptor matrix, gum surface descriptor matrix, adjacent tooth surface descriptor matrix, occlusal tooth surface descriptor matrix, abutment surface descriptor matrix, crown interior surface descriptor matrix, and crown exterior surface descriptor matrix.

18. The system of claim 14, wherein the plurality of descriptor matrixes are anchored in space.

* * * * *